US009166792B2

(12) United States Patent
Yamanaka et al.

(10) Patent No.: US 9,166,792 B2
(45) Date of Patent: Oct. 20, 2015

(54) DATA MANAGEMENT DEVICE, POWER USAGE CALCULATION SYSTEM, DATA MANAGEMENT METHOD, AND COMPUTER PROGRAM PRODUCT

(71) Applicant: KABUSHIKI KAISHA TOSHIBA, Minato-ku, Tokyo (JP)

(72) Inventors: Shinji Yamanaka, Tokyo (JP); Yuichi Komano, Yokohama (JP); Satoshi Ito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/179,745

(22) Filed: Feb. 13, 2014

(65) Prior Publication Data
US 2014/0310524 A1 Oct. 16, 2014

(30) Foreign Application Priority Data

Apr. 16, 2013 (JP) ................................. 2013-085874

(51) Int. Cl.
*H04L 29/06* (2006.01)
*H04L 9/32* (2006.01)
*H04L 9/00* (2006.01)

(52) U.S. Cl.
CPC .............. *H04L 9/3242* (2013.01); *H04L 9/008* (2013.01); *H04L 63/123* (2013.01); *H04L 63/0428* (2013.01)

(58) Field of Classification Search
CPC .................................................. H04L 9/3242
See application file for complete search history.

(56) References Cited

U.S. PATENT DOCUMENTS

| 6,963,976 | B1 * | 11/2005 | Jutla ............................. 713/181 |
| 8,542,593 | B1 * | 9/2013 | Kumar et al. ................. 370/235 |
| 8,635,465 | B1 * | 1/2014 | Juels et al. .................... 713/193 |
| 2002/0025037 | A1 * | 2/2002 | Sano .............................. 380/44 |
| 2005/0144437 | A1 * | 6/2005 | Ransom et al. ............... 713/151 |
| 2013/0073852 | A1 * | 3/2013 | Oba et al. ...................... 713/168 |

FOREIGN PATENT DOCUMENTS

JP 2012-058852 A 3/2012

OTHER PUBLICATIONS

J. Katz and A. Y. Lindell, "Aggregate Message Authentication Codes," CT-RSA 2008, pp. 166-169, 2008.*
M. H. Jakubowski and R. Venkatesan, "The Chain & Sum Primitive and Its Applications to MACs and Stream Ciphers," 1998.*
Background Art Information for concise explanation for Cite No. 1 (JP 2012-058852), Toshiba, Aug. 5, 2013.

* cited by examiner

*Primary Examiner* — Mohammad L Rahman
(74) *Attorney, Agent, or Firm* — Knobbe, Martens Olson & Bear LLP

(57) ABSTRACT

According to an embodiment, a data management device includes a receiver; a first calculator; a second calculator; and a transmitter. The receiver is configured to receive at least one piece of encrypted data obtained by encrypting a piece of data and at least one message authentication code for the piece of encrypted data. The first calculator is configured to aggregate pieces of encrypted data received to calculate aggregated encrypted data corresponding to a sum of the pieces of data encrypted. The second calculator is configured to sum up message authentication codes received to calculate a total value of the message authentication codes for the aggregated encrypted data. The transmitter is configured to transmit the aggregated encrypted data and the total value of the message authentication codes.

17 Claims, 10 Drawing Sheets

(A)  (B)

DATA MANAGEMENT DEVICE, POWER USAGE CALCULATION SYSTEM, DATA MANAGEMENT METHOD, AND COMPUTER PROGRAM PRODUCT

CROSS-REFERENCE TO RELATED APPLICATION

This application is based upon and claims the benefit of priority from Japanese Patent Application No. 2013-085874, filed on Apr. 16, 2013; the entire contents of which are incorporated herein by reference.

FIELD

Embodiments described herein relate generally to a data management device, a power usage calculation system, a data management method, and a computer program product.

BACKGROUND

A power usage calculation system measures a power usage per unit time and calculates a total amount of the power usage by aggregating the measured data. A third party or the like can thus refer to the measured power usage and guess the power usage of an individual or a group (a measurement destination), thereby possibly leading to the invasion of privacy. It is therefore required for the power usage calculation system to protect the privacy of the measurement destination with regards to the power usage being aggregated. Concerning such requirement, there has been proposed a method in the related art where the measured power usage is encrypted so that information on the power usage is processed while concealed.

However, the method in the related art cannot detect falsification of data.

DETAILED DESCRIPTION

Figure 1:
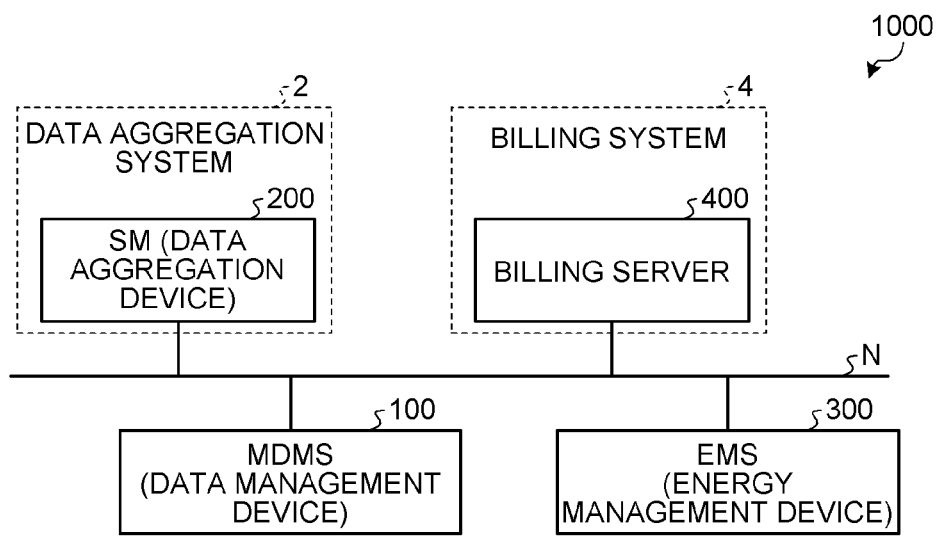
FIG. 1 is a diagram illustrating a configuration example of a power usage calculation system according to a first embodiment.

According to an embodiment, a data management device includes a receiver; a first calculator; a second calculator; and a transmitter. The receiver is configured to receive at least one piece of encrypted data obtained by encrypting a piece of data and at least one message authentication code for the piece of encrypted data. The first calculator is configured to aggregate pieces of encrypted data received to calculate aggregated encrypted data corresponding to a sum of the pieces of data encrypted. The second calculator is configured to sum up message authentication codes received to calculate a total value of the message authentication codes for the aggregated encrypted data. The transmitter is configured to transmit the aggregated encrypted data and the total value of the message authentication codes.

Embodiments of a data management device, a power usage calculation system, a data management method, and a data management program will now be described in detail with reference to the attached drawings.

First Embodiment

System Overview

An overview of a power usage calculation system according to the present embodiment will be described. A smart meter (hereinafter referred to as an "SM") in the power usage calculation system according to the present embodiment is installed at every aggregation range of power usage such as each household or office (in a predetermined aggregator), the SM corresponding to a power meter which aggregates the power usage of electrical equipment. The SM is connected to a meter data management system (hereinafter referred to as an "MDMS") and communicates therewith. In accordance with privacy information to be protected, the SM calculates encrypted data required to restore an input of an application (a function provision system providing a predetermined function) on the basis of the power usage within the aggregation range, thereby concealing the power usage within the aggregation range. The SM also calculates an MAC (Message Authentication Code) value corresponding to a piece of information used to detect falsification of measured data (meter data) of the power usage. The SM stores the calculated encrypted data and MAC value.

It is desired that the encrypted data be a piece of information by which the privacy information cannot be specified. When the power usage in unit time corresponds to the privacy information, for example, the SM calculates the encrypted data from the power usage per unit time and transmits the calculated encrypted data to the MDMS, which then stores the encrypted data received. When a site of the power being used corresponds to the privacy information, a plurality of the SMs calculates a plurality of the encrypted data from the power usage aggregated by each of the SMs and transmits the plurality of encrypted data calculated to the MDMS, which then stores the plurality of encrypted data received. Here, the privacy information refers to a piece of information by which a taste or behavior of an individual or a group can be specified. The privacy information includes information by which the individual or the group can be specified. The privacy information also includes information by which not the individual or the group itself but a disposition of the taste or behavior of the individual or the group can be specified.

The determination on whether or not the power usage per unit time corresponds to the privacy information may be made in advance or dynamically. Note that the encrypted data may be calculated and stored in the MDMS even when the power usage per unit time or the site of the power being used does not correspond to the privacy information.

The application includes, for example, an application which provides a billing function for the power used or an application which provides an energy management function controlling a power network such as a smart grid. These applications take an accurate value of the power usage within the aggregation range as an input. In this case, the MDMS employs a homomorphic encryption scheme to store an encryption result such that the encryption result of an accurate value of the total amount of the power usage (hereinafter referred to as a "total power usage") within the aggregation range is calculated without decrypting the encrypted power usage. The MDMS further employs a method of calculating a MAC value corresponding to the total power usage from a MAC value corresponding to the encrypted power usage.

A billing system and an energy management system (hereinafter referred to as an "EMS") will be described in the present embodiment as an example of a system which provides the aforementioned application. The EMS conceals the power usage per first unit time within the aggregation range and takes total power usage per the first unit time (hereinafter referred to as a "first total power usage") within the aggregation range as an input. Here, the first unit time represents a time unit by which the EMS controls the power network and equals 30 minutes, for example. The billing system takes total power usage per second unit time (hereinafter referred to as a "second total power usage") within the aggregation range as an input. Here, the second unit time represents a time unit (a billing period) by which a billing process in accordance with the power usage is performed and equals one month (approximately 30 days), for example.

System Configuration

FIG. 1 is a diagram illustrating a configuration example of a power usage calculation system 1000 according to the present embodiment. As illustrated in FIG. 1, the power usage calculation system 1000 according to the present embodiment includes an MDMS 100, a data aggregation system 2, an EMS 300, and a billing system 4, which are connected through a predetermined communication channel N. While there is one data aggregation system 2 illustrated in the figure, a plurality of the data aggregation systems 2 may be connected in the power usage calculation system 1000. The predetermined communication channel N can be a LAN (Local Area Network), an intranet, Ethernet (Registered Trademark), Internet or the like.

The MDMS 100 is a system which collects the power usage within the aggregation range from the data aggregation system 2 and manages it by one or a plurality of data management devices. The data aggregation system 2 is a system which aggregates the power usage of electrical equipment used within the aggregation range by one or a plurality of SMs 200 installed in the aggregation range. The SM 200 aggregates measured data of the power usage of the electrical equipment connected to the SM within the aggregation range. The EMS 300 is a system which controls a power network by one or a plurality of energy management devices (function provision devices) on the basis of the power usage managed by the MDMS 100. The billing system 4 is a system in which one or a plurality of billing servers 400 (function provision devices) charges for the power used on the basis of the power usage managed by the MDMS 100.

The data aggregation system 2 is provided with identification information identifying the aggregation range (hereinafter referred to as "aggregation identification information") which is stored in the SM 200 included in the data aggregation system 2. Moreover, each of the MDMS 100, the EMS 300, and the billing server 400 stores one or a plurality of the aggregation identification information provided to each data aggregation system 2 connected in the power usage calculation system 1000.

Aggregation information stored in the SM 200 includes at least the aggregation identification information and the power usage that are associated with each other. The SM 200 calculates encrypted data by using the information in which the aggregation identification information and the power usage are associated. In addition to the aggregation identification information and the power usage, another piece of information may be further associated in the aggregation information stored in the SM 200.

The following process is performed by the aforementioned configuration of the power usage calculation system 1000 according to the present embodiment. The SM 200 calculates first encrypted data by encrypting the power usage so as to be decrypted by the MDMS 100, second encrypted data by encrypting the power usage so as to be decrypted by the EMS 300, and third encrypted data by encrypting the power usage so as to be decrypted by the billing server 400. The SM 200 further calculates a first MAC value that corresponds to the first encrypted data and can be verified by the MDMS 100, a second MAC value that corresponds to the second encrypted data and can be verified by the EMS 300, and a third MAC value that corresponds to the third encrypted data and can be verified by the billing server 400. The SM 200 thereafter transmits the calculation result to the MDMS 100. The MDMS 100 decrypts the first encrypted data received from the SM 200, corrects the second encrypted data and the third encrypted data on the basis of the decrypted power usage, and stores the correction amount.

Having received a request from the EMS 300, the MDMS 100 uses the corrected second encrypted data to calculate encrypted data for first total power usage (an aggregated value of a plurality of individual power usage values per first unit time within the aggregation range). The MDMS 100 then sums up the second MAC value corresponding to the second encrypted data used in calculating the first total power usage and calculates a MAC value for the first total power usage. As a result, the MDMS 100 responds to the request by transmitting the calculation result to the EMS 300. Accordingly, the EMS 300 restores the power usage by decrypting the encrypted data of the first total power usage received from the MDMS 100 and performs power control within the aggregation range on the basis of the restored power usage. The EMS 300 at this time checks whether the first total power usage is falsified (checks the validity of the restored power usage) by using the MAC value for the first total power usage.

Having received a request from the billing server 400, the MDMS 100 uses the corrected third encrypted data to calculate encrypted data for second total power usage (an aggregated value of a plurality of individual power usage values per second unit time within the aggregation range). The MDMS 100 then sums up the third MAC value corresponding to the third encrypted data used in calculating the second total power usage and calculates a MAC value for the second total power usage. As a result, the MDMS 100 responds to the request by transmitting the calculation result to the billing server 400. Accordingly, the billing server 400 restores the power usage by decrypting the encrypted data of the second total power usage received from the MDMS 100 and charges for the power used within the aggregation range on the basis of the restored power usage. The billing server 400 at this time checks whether the second total power usage is falsified (checks the validity of the restored power usage) by using the MAC value of the second total power usage.

Device Configuration

The device configuration of the MDMS 100, the SM 200, the EMS 300, and the billing server 400 will now be described. Note that a main hardware configuration of each of the data management device included in the MDMS 100, the SM 200, the energy management device included in the EMS 300, and the billing server 400 according to the present embodiment is identical. Accordingly, there will be described the hardware configuration of the data management device included in the MDMS 100 as well as a different respect regarding the other devices.

Figure 2:
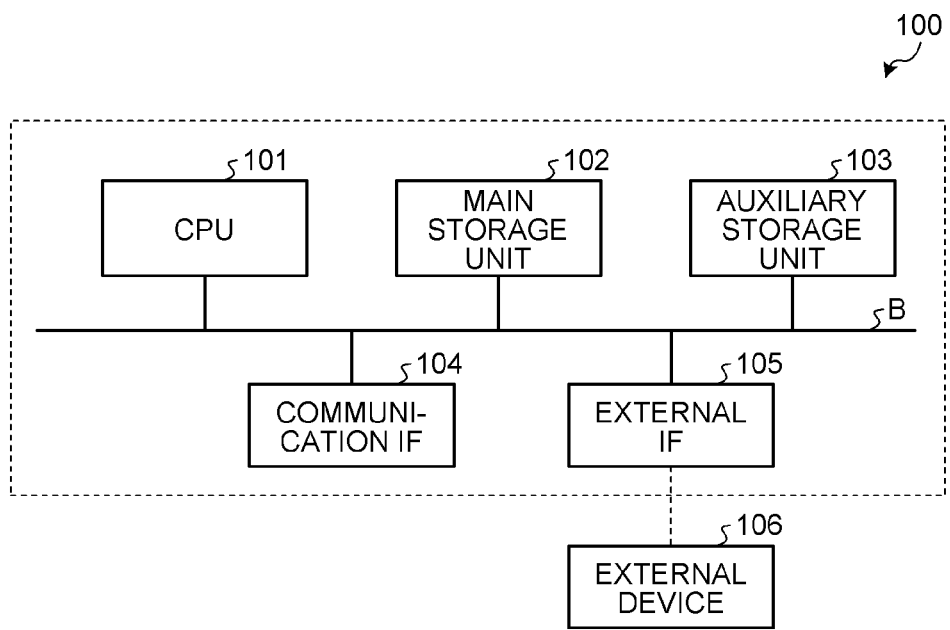
FIG. 2 is a diagram illustrating an example of a device configuration of an MDMS according to the first embodiment.

FIG. 2 is a diagram illustrating an example of the device configuration of the MDMS 100 according to the present embodiment. As illustrated in FIG. 2, the MDMS 100 according to the present embodiment includes a CPU (Central Processing Unit) 101, a main storage unit 102, an auxiliary storage unit 103, a communication IF (interface) 104, an external IF 105 and the like, which are connected through a bus B.

The CPU 101 is an arithmetic unit which performs overall control on the device and implements an installed function. The main storage unit 102 is a storage unit (a memory) which holds a program or data into a predetermined storage region. The main storage unit 102 can be a ROM (Read Only Memory) or a RAM (Random Access Memory), for example. The auxiliary storage unit 103 is a storage unit including a storage region, the capacity of which is larger than that of the main storage unit 102. The auxiliary storage unit 103 is a non-volatile storage unit such as an HDD (Hard Disk Drive) or a memory card. The auxiliary storage unit 103 may also include a storage medium such as a flexible disk (FD), a CD (Compact Disk), and a DVD (Digital Versatile Disk). The CPU 101 therefore performs the overall control on the device and implements the installed function by reading the program or the data from the auxiliary storage unit 103 to the main storage unit 102 and executing a process, for example.

The communication IF 104 is an interface which connects the device to the communication channel N, thereby allowing the MDMS 100 to perform data communication with the SM 200, the EMS 300, or the billing server 400. The external IF 105 is an interface which allows data to be transmitted/received between the device and an external device 106. The external device 106 corresponds to a display (such as a "liquid crystal display") which displays various information such as a process result or an input device (such as a "numeric keypad" or a "touch panel") which accepts an input by a user operation, for example.

Note that one or a plurality of measurement instruments (sensors) for measuring the power usage is connected to an external IF (not shown) included in the SM 200, for example. The SM 200 can perform the aggregation of the power usage as a result. In addition to the aforementioned hardware, the SM 200 may also include a display that displays various information such as the power usage or an input device that accepts an input by a user operation.

As described above, the power usage calculation system 1000 according to the present embodiment provides a power usage management service by which the aforementioned configuration can detect the falsification of stored data stored in the device or communication data transmitted/received between the devices.

Functional Configuration

A function included in the power usage calculation system 1000 according to the present embodiment will now be described. The SM 200 calculates each encrypted data for the power usage (the first to third encrypted data) that can be decrypted by each use system such as the MDMS 100, the EMS 300, and the billing system 4 using the power usage. The SM 200 also calculates each MAC value for the power usage being used by each use system (calculates the first to third MAC values corresponding to the first to third encrypted data for the power usage). As a result, the SM 200 transmits the calculation result to the MDMS 100. In response, the MDMS 100 decrypts the encrypted data (the first encrypted data) provided for the MDMS 100 and received from the SM 200. The MDMS 100 then corrects, on the basis of the decrypted power usage, each encrypted data (the second and third encrypted data) provided for each use system such as the EMS 300 and the billing system 4 and stores the correction amount. Subsequently, the MDMS 100 accepts the request from each use system such as the EMS 300 or the billing system 4. The MDMS 100 calculates each encrypted data for the total power usage (the first or second total power usage) per unit time within the aggregation range by using the encrypted data provided for the use system from which the request has been accepted. The MDMS 100 then sums up the MAC value for the power usage and calculates each MAC value for the total power usage (calculates a total value of the MAC value corresponding to the first or second total power usage by summing up the second or third MAC value corresponding to the second or third encrypted data). As a result, the MDMS 100 responds to the request by transmitting the calculation result to the use system which has made the request. Accordingly, each use system such as the EMS 300 or the billing system 4 restores the power usage by decrypting the encrypted data for the total power usage received from the MDMS 100. The use system then uses the received MAC value for the total power usage to check the validity of the restored power usage, executes a predetermined process on the basis of the power usage that has been checked, and provides the function.

In the power usage calculation system 1000, one can guess the power used by the measurement destination when the power usage is referred to by a third party or the like, which possibly leads to the invasion of privacy. It is thus required in the power usage calculation system 1000 to protect the privacy of the measurement destination regarding the power usage being aggregated. The falsification of data however cannot be detected by the scheme that has been proposed in the related art. It is therefore possible that a function appropriate for the user cannot be provided when the application is not executed correctly due to the falsification of the power usage by the third party or the like (an accurate function based on the calculated value cannot be provided because the calculation based on the power usage is not performed correctly).

Now, the function included in the power usage calculation system 1000 according to the present embodiment provides a mechanism as follows. The SM 200 calculates the encrypted data for the power usage and the MAC value corresponding to the encrypted data. The SM 200 then transmits the calculation result to the MDMS 100. In response to the request from the EMS 300 or the billing system 4, the MDMS 100 calculates the encrypted data and the MAC value for the total power usage within the aggregation range on the basis of the data received from the SM 200. The MDMS 100 thereafter transmits the calculation result to the EMS 300 or the billing system 4 which has made the request.

The function of the power usage calculation system 1000 according to the present embodiment can therefore protect the privacy of the measurement destination by encrypting and concealing the power usage stored within the device or the power usage transmitted/received between the devices. Moreover, the function of the power usage calculation system 1000 according to the present embodiment can detect the falsification of data by calculating the MAC value for each of the power usage or the total power usage and managing each MAC value calculated in association with each of the power usage or the total power usage.

A configuration and an operation of the function included in the power usage calculation system 1000 according to the present embodiment will now be described. The power usage calculation system 1000 according to the present embodiment can be divided into a function included in the SM 200, a function included in the MDMS 100, a function included in the EMS 300, and a function included in the billing server 400.

Function of SM 200

Figure 3:
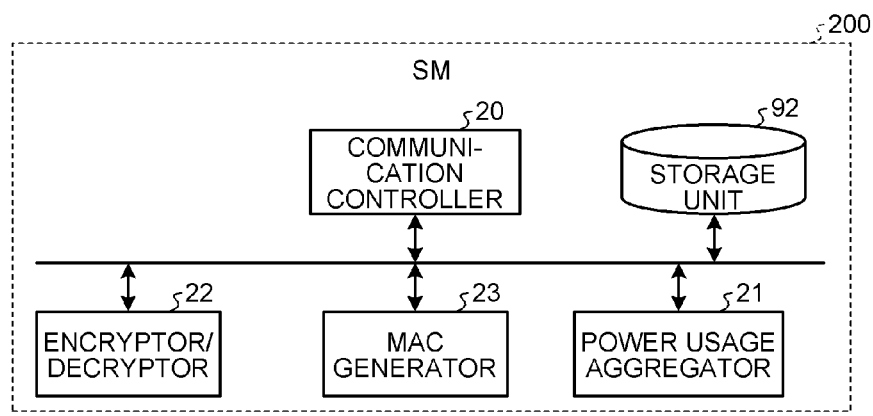
FIG. 3 is a diagram illustrating an example of a functional configuration of an SM according to the first embodiment.

FIG. 3 is a diagram illustrating an example of a functional configuration of the SM 200 according to the present embodiment. As illustrated in FIG. 3, the function of the SM 200 according to the present embodiment includes a communication controller 20 (a first transmitter), a power usage aggregator 21, an encryptor/decryptor 22, a MAC generator 23 and the like. Each of these functions is implemented by installing software. Each functional unit is thus implemented when a program is executed by a CPU (not shown) included in the SM 200. Note that the communication controller 20 may be implemented when the program is executed by an arithmetic unit included in a communication IF (not shown) of the SM 200. The function of the SM 200 according to the present embodiment further includes a storage unit 92. The storage unit 92 corresponds to a predetermined storage region of an auxiliary storage unit (not shown) included in the SM 200, for example.

The communication controller 20 controls data communication with the MDMS 100. Specifically, the communication controller 20 transmits to the MDMS 100 the encrypted data for the power usage output from the encryptor/decryptor 22, the MAC value output from the MAC generator 23, and the like. The communication controller 20 at this time may transmit the encrypted data for the power usage and the MAC value to the MDMS 100 at every predetermined lapse of time (periodically). Here, the predetermined time represents a timing at which the encrypted data for the power usage and the MAC value are transmitted. The predetermined time may be set to synchronize with a timing at which the use system (such as the EMS 300 or the billing system 4) using the power usage is operated, for example. Moreover, the communication controller 20 receives a control command that controls the operation of the SM 200 from the MDMS 100.

The power usage aggregator 21 receives the measured power usage at every predetermined lapse of time from the electrical equipment within the aggregation range and aggregates the power usage per unit time. The power usage aggregator 21 stores the aggregated power usage into the storage unit 92. The power usage aggregator 21 controls an aggregation operation of the power usage (an operation to start, finish, discontinue, or stop the aggregation process) on the basis of the control command received by the communication controller 20. The stored power usage is deleted after a predetermined period has elapsed. Here, the predetermined period corresponds to a time and date indicating a storage period for which the power usage is stored and equals two weeks or 30 days, for example. The predetermined period can be set to an arbitrary period as long as the stored data amount of the power usage does not exceed the capacity of the storage region of where the data is stored during operation of the system.

The encryptor/decryptor 22 encrypts or decrypts the aggregated power usage. Specifically, the encryptor/decryptor 22 uses a common key provided for encryption/decryption and stored in the storage unit 92 to encrypt the power usage and calculates the encrypted data corresponding to the power usage. The encryptor/decryptor 22 further decrypts the encrypted data and restores the power usage. The encryptor/decryptor 22 at this time employs a scheme such as common key encryption (symmetric key encryption) or stream encryption (stream cipher) in the encryption/decryption.

Common Key

A common key will now be described. The common key corresponds to a key provided for encryption/decryption (an encryption/decryption key) and shared between a source from which the encrypted data for the power usage is transmitted and a destination to which the encrypted data for the total power usage is transmitted. The present embodiment includes a common key Kp shared between the billing server 400 and the SM 200, a common key Ke shared between the EMS 300 and the SM 200, and a common key Km shared between the MDMS 100 and the SM 200. Each of the common keys Kp, Ke, and Km is stored in the storage unit 92. Note that each SM 200 may use the same or different common keys Kp, Ke, and Km among the plurality of SMs 200. The confidentiality is enhanced when the different common keys Kp, Ke, and Km are used in each SM 200 because the SMs 200 do not know one another's common key Kp, Ke, or Km.

Encryption Method

A specific encryption method employed by the encryptor/decryptor 22 according to the present embodiment will be described. The encryptor/decryptor 22 does not directly use each of the aforementioned common keys in encrypting the power usage. That is, the encryptor/decryptor 22 uses each common key to create a temporary key and uses the temporary key created to encrypt the power usage. The temporary key is created on the basis of time information indicating an aggregation time and the common key, for example. The time information includes a date such as "Jan. 1, 2010", a date and time such as "14:35:46, 3/1/2010", or an elapsed time in seconds from an origin in GMT (Greenwich Mean Time), for example.

Letting Kp, Ke, and Km be the common key and "t" be the time information, the encryptor/decryptor 22 calculates temporary keys Kp_t, Ke_t, and Km_t according to Equation (1) to (3) below.

$$Kp1\_t = h1(Kp, t) \quad (1)$$

$$Ke1\_t = h1(Ke, t) \quad (2)$$

$$Km1\_t = h1(Km, t) \quad (3)$$

A part "h1(x, y)" in the expression represents a one-way function or a keyed-hashing function with "x" and "y" used as an input. The one-way function includes sha-1, md5 (Message Digest Algorithm 5), or sha256 while the keyed-hashing function includes hmac (Keyed-Hashing for Message Authentication code), for example.

The encryptor/decryptor 22 performs homomorphic encryption. For example, the homomorphic encryption of data d with an encryption key ek_P means that Equation (4) below is satisfied with regards to data d and d'.

$$Enc\_P(ek\_P,d) * Enc\_P(ek\_P,d') = Enc\_P(ek\_P,d+d') \quad (4)$$

Here, a (+) sign in the expression represents arithmetic addition while a (*) sign represents an appropriate operator. These signs hereinafter represent the similar meaning as well.

The homomorphic encryption described above includes Caesar cipher using a sufficiently large base number or an encryption method as described in Pascal Paillier, Public-Key Cryptosystems Based on Composite Degree Residuosity Classes, EUROCRYPT 1999, pp 223-238, for example. In this case, the sign (*) represents addition and modular multiplication in a residue class ring.

The Caesar cipher is employed as the homomorphic encryption method in the present embodiment. Moreover, the addition in the residue class ring is employed for the sign (*).

Letting "dt" be the power usage aggregated at time t, the encryptor/decryptor 22 uses the temporary key Kp1_t created from the common key Kp shared with the billing server 400 to encrypt the power usage dt by Equation (5) below, and calculates third encrypted data cp_t for the power usage dt being used by the billing system 4.

$$cp\_t = dt + KpST1\_t \pmod{\alpha} \quad (5)$$

Here, a part "KpST1_t" represents a key sequence (=ST (Kp1_t)) obtained by the stream encryption using the temporary key Kp1_t at time t as the key. Note that ST( ) represents the stream encryption. The stream encryption can be implemented by using RC4 (Ronald's Code 4) or operating block cipher in a use mode such as an OFB (Output Feed Back), CFB (Cipher Feed Back), or CTR (Counter) mode, for example. Moreover, a parameter α is a large prime number and needs to be shared between what is performing the encryption and what is performing the decryption.

Likewise, the encryptor/decryptor 22 uses the temporary key Ke1_t created from the common key Ke shared with the EMS 300 to encrypt the power usage dt by Equation (6) below and calculates second encrypted data ce_t for the power usage dt being used by the EMS 300.

$$ce\_t = dt + KeST1\_t \pmod{\alpha} \quad (6)$$

Here, a part "KeST1_t" represents a key sequence (=ST (Ke1_t)) obtained by the stream encryption using the temporary key Ke1_t at time t as the key.

Likewise, the encryptor/decryptor 22 uses the temporary key Km1_t created from the common key Km shared with the MDMS 100 to encrypt the power usage dt by Equation (7) below and calculates first encrypted data cm_t for the power usage dt being used by the MDMS 100.

$$cm\_t = dt + KmST1\_t \pmod{\alpha} \quad (7)$$

Here, a part "KmST1_t" represents a key sequence (=ST (Km1_t)) obtained by the stream encryption using the temporary key Km1_t at time t as the key.

The time t required in decrypting need be transmitted to a decryption destination along with the encrypted data. Accordingly, the communication controller 20 transmits to the MDMS 100 the time t corresponding to each of the first encrypted data cm_t, the second encrypted data ce_t, and the third encrypted data cp_t for the power usage in association with each encrypted data. The communication controller 20 also receives from the MDMS 100 the first encrypted data cm_t for the power usage as well as the time t corresponding to the first encrypted data cm_t.

The MAC generator 23 generates the MAC value for the aggregated power usage (information used to detect falsification of the power usage). Specifically, the MAC generator 23 calculates the MAC value for the power usage by using a key provided to generate the MAC value and stored in the storage unit 92 (hereinafter referred to as a "MAC generation key").

MAC Generation Key

The MAC generation key will now be described. The MAC generation key corresponds to a key provided to generate/verify the MAC value and shared between a source from which the MAC value for the power usage is transmitted and a destination to which the MAC value for the total power usage is transmitted. The present embodiment includes a MAC generation key Kp_mac shared between the billing server 400 and the SM 200, a MAC generation key Ke_mac shared between the EMS 300 and the SM 200, and a MAC generation key Km_mac shared between the MDMS 100 and the SM 200. Each of the MAC generation keys Kp_mac, Ke_mac, and Km_mac is stored in the storage unit 92. Note that each SM 200 may use the same or different MAC generation keys Kp_mac, Ke_mac, and Km_mac among the plurality of SMs 200. The confidentiality is enhanced when the different MAC generation keys Kp_mac, Ke_mac, and Km_mac are used in each SM 200 because the SMs 200 do not know one another's MAC generation key Kp_mac, Ke_mac, or Km_mac.

Method of Generating MAC

A specific method of generating the MAC by the MAC generator 23 according to the present embodiment will be described. The MAC generator 23 generates the MAC in a homomorphic manner. For example, the MAC value for data d is generated in the homomorphic manner with a MAC generation key k_mac when Equation (8) below is satisfied with regards to data d and d'.

$$MAC(k\_mac,d) * MAC(k\_mac,d') = MAC(k\_mac,d+d') \quad (8)$$

Here, a (+) sign in the expression represents arithmetic addition while an (*) sign represents an appropriate operator.

Letting "dt" be the power usage aggregated at time t, the MAC generator 23 uses the MAC generation key Kp_mac shared with the billing server 400 to calculate a third MAC value Macp_t for the power usage dt being used by the billing system 4 according to Equation (9) below.

$$Macp\_t = dt \times Kp\_mac + KpST2\_t \pmod{\alpha} \quad (9)$$

Here, a part "KpST2 t" represents a key sequence (=ST (Kp2_)) obtained by the stream encryption using a temporary key Kp2_t at time t as the key, where the temporary key Kp2_t is calculated by h2(Kp, t). Note that h2(x, y) corresponds to the one-way function or the keyed-hashing function with "x" and "y" used as an input.

Likewise, the MAC generator 23 uses the MAC generation key Ke_mac shared with the EMS 300 to calculate a second MAC value Mace_t for the power usage dt being used by the EMS 300 according to Equation (10) below.

$$Mace\_t = dt \times Ke\_mac + KeST2\_t \pmod{\alpha} \quad (10)$$

Here, a part "KeST2_t" represents a key sequence (=ST (Ke2_t)) obtained by the stream encryption using a temporary key Ke2_t at time t as the key, where the temporary key Ke2_t is calculated by h2(Ke, t).

Likewise, the MAC generator 23 uses the MAC generation key Km_mac shared with the MDMS 100 to calculate a first MAC value Macm_t for the power usage dt being used by the MDMS 100 according to Equation (11) below.

$$Macm\_t = dt \times Km\_mac + KmST2\_t \pmod{\alpha} \quad (11)$$

Here, a part "KmST2_t" represents a key sequence (=ST (Km2_t)) obtained by the stream encryption using a temporary key Km2_t at time t as the key, where the temporary key Km2_t is calculated by h2(Km, t).

The aforementioned function of the SM 200 according to the present embodiment calculates each of the first to third encrypted data for the power usage that can be decrypted by each use system such as the MDMS 100, the EMS 300, and the billing system 4 which use the power usage. The SM 200 further calculates each of the first to third MAC values for the power usage being used by each use system. As a result, the SM 200 transmits the calculation result to the MDMS 100. Note that the calculation result is stored in the storage unit 92.

Function of MDMS 100

Figure 4:
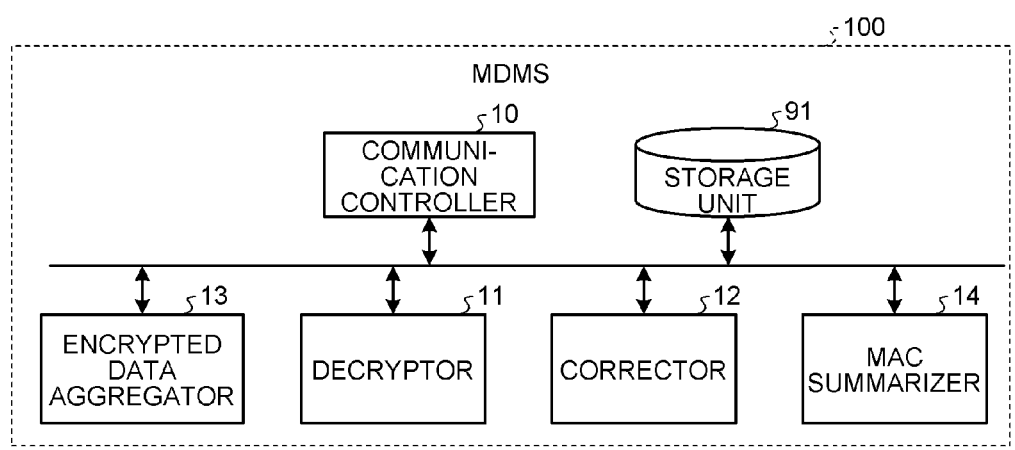
FIG. 4 is a diagram illustrating an example of a functional configuration of the MDMS according to the first embodiment.

FIG. 4 is a diagram illustrating an example of a functional configuration of the MDMS 100 according to the present embodiment. As illustrated in FIG. 4, the function of the MDMS 100 according to the present embodiment includes a communication controller (a receiver, a transmitter, a first receiver, and a second transmitter) 10, a decryptor 11, a corrector 12, an encrypted data aggregator (a first calculator) 13, a MAC summarizer (a second calculator) 14 and the like. Each of these functions is implemented by installing software. Each functional unit is thus implemented when a program is executed by the CPU 101 included in the MDMS 100 (the data management device). Note that the communication controller 10 may be implemented when the program is executed by an arithmetic unit included in the communication IF 104 of the MDMS 100. The function of the MDMS 100 according to the present embodiment further includes a storage unit 91. The storage unit 91 corresponds to a predetermined storage region of the auxiliary storage unit 103 included in the MDMS 100, for example.

The communication controller 10 controls data communication with another device such as the SM 200, the EMS 300, or the billing server 400. Specifically, the communication controller 10 receives the encrypted data (the first to third encrypted data) and the MAC values (the first to third MAC values) for the power usage from the SM 200. The encrypted data (the first to third encrypted data) and the MAC values (the first to third MAC values) for the power usage received from the SM 200 are stored in the storage unit 91 such that the encrypted data for the power usage is combined with the MAC value corresponding to the encrypted data (to be a pair). The communication controller 10 also transmits the control command to the SM 200. The control command transmitted to the SM 200 controls the aggregation operation of the power usage and gives an instruction to start, finish, discontinue, or stop the aggregation process of the power usage and to transmit the power usage, for example. The communication controller 10 further receives a request command (a control command indicating an operational request) from the EMS 300 or the billing server 400. The communication controller 10 responds to the requestor by transmitting to the EMS 300 or the billing server 400 the encrypted data for the total power usage that is output from the encrypted data aggregator 13 and the MAC value for the total power usage that is output from the MAC summarizer 14.

The decryptor 11 decrypts the encrypted data for the power usage. Specifically, the decryptor 11 uses the common key provided for encryption/decryption and stored in the storage unit 91 to decrypt the encrypted data received and therefore the decryptor 11 restores the power usage. Note that the storage unit 91 stores the common key provided for encryption/decryption and shared with the SM 200.

Decryption Method

A specific decryption method employed by the decryptor 11 according to the present embodiment will be described. The decryptor 11 first calculates the temporary key Km1_t (=h1(Km, t)) by using the common key Km shared with the SM 200 and the time t corresponding to the first encrypted data cm_t for the power usage received from the SM 200. The decryptor 11 then calculates the key sequence KmST1_t (=ST(Km1_t)) by the stream encryption (ST( )) based on the temporary key Km1_t calculated. As a result, the decryptor 11 calculates the power usage (the power usage being used by the MDMS 100) dt at the time t by Equation (12) below and restores the power usage from the encrypted data.

$$dt = cm\_t - KmST1\_t \pmod{\alpha} \quad (12)$$

The corrector 12 uses the restored power usage to correct the second and third encrypted data received from the SM 200. Specifically, the corrector 12 first checks the validity of the restored power usage (verifies whether or not the restored power usage is free of error). The corrector 12 at this time checks the validity by the following method. The MDMS 100 temporarily holds in the main storage unit (memory) 102 the past power usage (the power usage continuous in time series per unit time) that is received from the same SM 200 and restored, for example. Accordingly, the corrector 12 verifies the validity by comparing the power usage restored this time with the past power usage, determining whether or not a differential value is less than or equal to a threshold, and determining whether or not the power usage restored this time is free of error, for example. As a result, the corrector 12 calculates a correction amount (differential value) $\Delta d$ for the power usage on the basis of the result of the validity check.

Correction Method

A specific correction method employed by the corrector 12 according to the present embodiment will be described. The corrector 12 uses the calculated correction amount $\Delta d$ to correct the second encrypted data ce_t and the third encrypted data cp_t for the power usage according to Equations (13) and (14) below.

$$ce\_t' = ce\_t + \Delta d \quad (13)$$

$$cp\_t' = cp\_t + \Delta d \quad (14)$$

The corrector 12 stores, into the storage unit 91, second encrypted data ce_t' and third encrypted data cp_t' which have been corrected. At this time, the corrector 12 stores into the storage unit 91 the corrected second encrypted data ce_t' and third encrypted data cp_t' in combination with the correction amount $\Delta d$ (to form a pair).

The encrypted data aggregator 13 calculates the encrypted data for the total power usage by aggregating the encrypted data for the power usage. Specifically, the encrypted data aggregator 13 calculates the encrypted data for the total power usage per unit time by aggregating the encrypted data for the power usage stored in the storage unit 91 or the encrypted data for the power usage corrected by the corrector 12. That is, the encrypted data aggregator 13 aggregates the encrypted data received from the SM 200 and calculates the aggregated encrypted data corresponding to the sum of the data encrypted.

Method of Aggregating Encrypted Data

A specific method of aggregating the encrypted data employed by the encrypted data aggregator 13 according to the present embodiment will be described. The encrypted data aggregator 13 calculates the encrypted data for the first total power usage per unit time by aggregating the second encrypted data for the power usage corrected by the corrector 12 or the second encrypted data for the power usage stored in the storage unit 91. The encrypted data aggregator 13 at this time sums up the correction amount used in correcting the second encrypted data to calculate the total value of the correction amount corresponding to the first total power usage (hereinafter referred to as "correction amount for the first total power usage").

Letting sm1 to smx be the aggregation range in which the plurality of SMs 200 performs aggregation at the same time t and letting the unit time of the power usage aggregated by each SM 200 be 30 minutes, the encrypted data aggregator 13 calculates encrypted data ce_all for the first total power usage by aggregating the second encrypted data for the power usage being used by the EMS 300 (the corrected second encrypted data) ce_t' according to Equation (15-1) below. Note that the aggregation range of the aggregation data corresponds to the plurality of aggregation ranges corresponding to the SMs 200.

$$ce\_all = ce\_t'\_sm1 + \ldots + ce\_t'\_smx \quad (15\text{-}1)$$

In other words, the encrypted data aggregator 13 aggregates the second encrypted data for the power usage being used by the EMS 300 while targeting the plurality of aggregation ranges (the plurality of SMs 200) at the same aggregation time.

The encrypted data for the first total power usage may be calculated by Equation (15-2) below in place of Equation (15-1) described above. That is, the encrypted data ce_all for the first total power usage may be calculated by aggregating the second encrypted data (the second encrypted data stored in the storage unit 91) ce_t for the power usage being used by the EMS 300.

$$ce\_all = ce\_t\_sm1 + \ldots + ce\_t\_smx \quad (15\text{-}2)$$

Moreover, the encrypted data aggregator 13 uses the correction amount Δd used in correcting the second encrypted data to calculate a correction amount Δde_all for the first total power usage according to Equation (16) below.

$$\Delta de\_all = \Delta d\_sm1 + \ldots + \Delta d\_smx \quad (16)$$

Likewise, the encrypted data aggregator 13 calculates the encrypted data for the second total power usage per unit time by aggregating the third encrypted data for the power usage stored in the storage unit 91 or the third encrypted data for the power usage corrected by the corrector 12. The encrypted data aggregator 13 at this time sums up the correction amount used in correcting the third encrypted data to calculate the correction amount for the second total power usage.

Letting sm be the aggregation range in which a predetermined SM 200 performs aggregation and the unit time of the power usage aggregated by the SM 200 be 30 minutes, the encrypted data aggregator 13 calculates encrypted data cp_all for the second total power usage by aggregating the third encrypted data (the corrected third encrypted data) cp_t' for the power usage being used by the billing system 4 according to Equation (17-1) below. In this case, the unit time (second unit time: one month) of the power usage being used by the billing system 4 corresponds to the period during which the encrypted data is aggregated (hereinafter referred to as an "aggregation period"). The aggregation period of the encrypted data is therefore expressed as time t1 to t1440 when the unit time for the power usage being aggregated is 30 minutes.

$$cp\_all = cp\_t1'\_sm + \ldots + cp\_t1440'\_sm \quad (17\text{-}1)$$

That is, the encrypted data aggregator 13 aggregates the third encrypted data for the power usage being used by the billing system 4 by targeting a plurality of aggregation times (in time series) in the same aggregation range (the same SM 200).

Moreover, the encrypted data for the second total power usage may be calculated by Equation (17-2) below in place of Equation (17-1) described above. That is, the encrypted data cp_all for the second total power usage may be calculated by aggregating the third encrypted data (the third encrypted data stored in the storage unit 91) cp_t for the power usage being used by the billing system 4.

$$cp\_all = cp\_t1\_sm + \ldots + cp\_t1440\_sm \quad (17\text{-}2)$$

The encrypted data aggregator 13 further uses the correction amount Δd used in correcting the third encrypted data to calculate a correction amount Δdp_all for the second total power usage according to Equation (18) below.

$$\Delta dp\_all = \Delta d\_t1\_sm + \ldots + \Delta d\_t1440\_sm \quad (18)$$

The MAC summarizer 14 calculates the MAC value for the total power usage (the information used to detect falsification of the total power usage) by summing up the MAC value for the power usage. Specifically, the MAC summarizer 14 calculates the MAC value for the total power usage per unit time by summing up the MAC value corresponding to the encrypted data used in calculating the total power usage. In other words, the MAC summarizer 14 calculates the MAC value corresponding to the encrypted data for the total power usage by summing up the MAC value received from the SM 200.

MAC Summation Method

A specific method of summing up the MAC will be described, the method being employed by the MAC summarizer 14 according to the present embodiment. The MAC summarizer 14 calculates the MAC value for the first total power usage by summing up the second MAC value corresponding to the second encrypted data used in calculating the first total power usage.

Letting sm1 to smx be the aggregation range in which the plurality of SMs 200 performs aggregation at the same time t and letting the unit time of the power usage aggregated by each SM 200 be 30 minutes, the MAC summarizer 14 calculates a MAC value Mace_all for the first total power usage by summing up the second MAC value Mace_t for the power usage being used by the EMS 300, according to Equation (19) below. In this case, the plurality of aggregation ranges corresponding to the SM 200 corresponds to the range in which the MAC value is summed up (hereinafter referred to as a "summation range").

$$Mace\_all = Mace\_t\_sm1 + \ldots + Mace\_t\_smx \quad (19)$$

That is, the MAC summarizer 14 sums up the second MAC value for the power usage being used by the EMS 300 while targeting the plurality of aggregation ranges (the plurality of SMs 200) at the same aggregation time.

Likewise, letting sm be the aggregation range in which a predetermined SM 200 performs aggregation and the unit time of the power usage aggregated by the SM 200 be 30 minutes, the MAC summarizer 14 calculates a MAC value Macp_all for the second total power usage by summing up the third MAC value Macp_t for the power usage being used by the billing system 4, according to Equation (20) below. In this case, the unit time (the second unit time: one month) of the power usage being used by the billing system 4 corresponds to a total period. The total period is therefore expressed as the time t1 to t1440 when the unit time of the power usage being aggregated is 30 minutes.

$$Macp\_all = Macp\_t1\_sm + \ldots + Macp\_t1440\_sm \quad (20)$$

That is, the MAC summarizer 14 sums up the third MAC value for the power usage being used by the billing system 4 while targeting the plurality of aggregation times (in time series) in the same aggregation range (the same SM 200).

The aforementioned function of the MDMS 100 according to the present embodiment decrypts the first encrypted data provided for the MDMS 100 and received from the SM 200. The MDMS 100 then corrects each of the second and third encrypted data provided for each use system such as the EMS 300 and the billing system 4 on the basis of the decrypted power usage and stores the correction amount. Subsequently, the MDMS 100 accepts the request from each use system such as the EMS 300 or the billing system 4. The MDMS 100 uses the second or third encrypted data provided for the use system from which the request is accepted and calculates the encrypted data for each of the first total power usage and the second total power usage per unit time in the aggregation range. The MDMS 100 thereafter calculates the MAC value for each of the first total power usage and the second total power usage by summing up the second or third MAC value. The calculation result is stored in the storage unit 91.

Function of EMS 300

Figure 5:
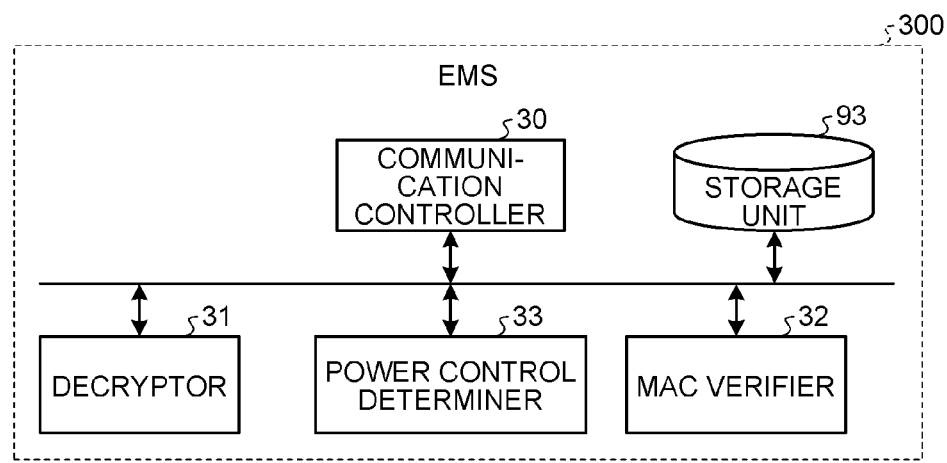
FIG. 5 is a diagram illustrating an example of a functional configuration of an EMS according to the first embodiment.

FIG. 5 is a diagram illustrating an example of a functional configuration of the EMS 300 according to the present embodiment. As illustrated in FIG. 5, the EMS 300 according to the present embodiment includes a communication controller (a second receiver) 30, a decryptor 31, a MAC verifier 32, a power control determiner (an executor) 33 and the like. Each of these functions is implemented by installing software. Each functional unit is thus implemented when a program is executed by a CPU (not shown) included in the EMS 300 (the energy management device). Note that the communication controller 30 may be implemented when the program is executed by an arithmetic unit included in a communication IF (not shown) of the EMS 300. The function of the EMS 300 according to the present embodiment further includes a storage unit 93. The storage unit 93 corresponds to a predetermined storage region of an auxiliary storage unit (not shown) included in the EMS 300, for example. The storage unit 93 stores data received from the MDMS 100.

The communication controller 30 controls data communication with another device such as the MDMS 100. Specifically, the communication controller 30 receives the encrypted data, the MAC value, and the correction amount for the first total power usage that are transmitted from the MDMS 100. The communication controller 30 also transmits a request command (a control command indicating an operational request) to the MDMS 100. As a result, the communication controller 30 receives the encrypted data, the MAC value, and the correction amount for the first total power usage from the MDMS 100 and accepts the response to the request. Note that the request command transmitted to the MDMS 100 includes the control command which makes a request to transmit various control information such as a current value and a voltage value used in power control.

The decryptor 31 decrypts the encrypted data for the first total power usage. Specifically, the decryptor 31 uses a common key provided for encryption/decryption and stored in the storage unit 93 to decrypt the encrypted data received and restores the first total power usage. Note that the storage unit 93 stores the common key provided for encryption/decryption and shared with the SM 200.

Decryption Method

A specific decryption method employed by the decryptor 31 according to the present embodiment will be described. The decryptor 31 first calculates the temporary key Ke1_t (=h1(Ke, t)) by using the common key Ke shared with the SM 200 and the time t corresponding to the encrypted data ce_all for the first total power usage that is received from the MDMS 100. The decryptor 31 then calculates the key sequence KeST1_t (=ST(Ke1_t)) by the stream encryption (ST( )) based on the temporary key Ke1_t calculated. As a result, the decryptor 31 calculates the first total power usage (the total power usage being used by the EMS 300) dte_all at the time t (the same time for the plurality of aggregation ranges) by Equations (21) and (22) below and restores the total power usage from the encrypted data.

$$Ke\_all = KeST1\_t\_sm1 + \ldots + KeST1\_t\_smx \quad (21)$$

$$dte\_all = ce\_all - Ke\_all \quad (22)$$

The first total power usage is the total amount of power usage in the aggregation range. Accordingly, the encrypted data of each power usage at the aggregation time t can be decrypted by the temporary key created by using each common key shared between each of the SMs 200 included in the aggregation range. The decryptor 31 calculates the key sequence of the temporary key by using each common key shared between each of the SMs 200, uses each temporary key calculated, and restores the first total power usage from the encrypted data for the first total power usage.

The MAC verifier 32 checks the validity of the restored first total power usage (verifies whether or not the restored first total power usage is free of error). Specifically, the MAC verifier 32 verifies whether or not the first total power usage is free of error by using the MAC value for the first total power usage restored by the decryptor 31, the correction amount for the first total power usage received from the MDMS 100, and a MAC verification key shared with the SM 200. Note that the MAC verification key shared with the SM 200 is stored in the storage unit 93.

MAC Verification Method

A specific MAC verification method employed by the MAC verifier 32 according to the present embodiment will be described. The MAC verifier 32 first calculates the temporary key Ke2_t (=h2(Ke, t)) by using a MAC verification key Ke_mac shared with the SM 200 and the time t corresponding to the encrypted data ce_all for the first total power usage that is received from the MDMS 100. The MAC verifier 32 then calculates the key sequence KeST2_t (=ST(Ke2_t)) by the stream encryption (ST( )) based on the temporary key Ke2_t calculated. As a result, the MAC verifier 32 checks the validity of the restored first total power usage by Equations (23) and (24) below.

$$KeST2\_all = KeST2\_t\_ms1 + \ldots + KeST2\_t\_msx \quad (23)$$

$$Mace\_t = ?(dte\_all - \Delta de\_all) \times Ke\_mac + KeST2\_all \quad (24)$$

Note that a symbol (=?) in the expression represents an operator for the comparison determination. Accordingly, the MAC verifier 32 verifies whether or not the first total power usage is free of error on the basis of the determination result of whether or not the calculation result on the right side of Equation (24) matches the MAC value Mace_t for the first total power usage.

The power control determiner 33 determines whether or not to perform power control to control a power network. Specifically, the power control determiner 33 determines whether or not to perform power control on the basis of the first total power usage restored by the decryptor 31. The power control according to the present embodiment is a control performed as follows. For example, the power control is performed to suppress power use in the aggregation range such as each household or office when the power control determiner 33 has determined that the first total power usage exceeds a preset upper threshold. On the other hand, the power control is performed to store surplus power into a storage battery or the like (charge a storage battery) installed within the aggregation range when the power control determiner 33 has determined that the first total power usage falls below a preset lower threshold. Note that these power controls can be implemented by transmitting a power control command to a device to be controlled such as the SM 200 from the EMS 300 through the communication controller 30, for example.

The aforementioned function of the EMS 300 according to the present embodiment restores the power usage by decrypting the encrypted data for the first total power usage that is received from the MDMS 100. The EMS 300 then uses the MAC value for the first total power usage being received to check the validity of the restored power usage, executes a predetermined process on the basis of the power usage being checked, and provides the power control function.

Function of Billing Server 400

Figure 6:
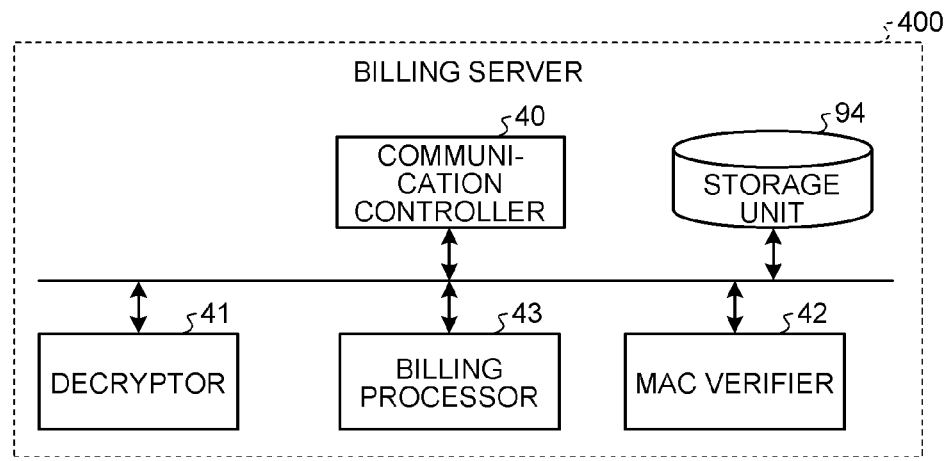
FIG. 6 is a diagram illustrating an example of a functional configuration of a billing server according to the first embodiment.

FIG. 6 is a diagram illustrating an example of a functional configuration of the billing server 400 according to the present embodiment. As illustrated in FIG. 6, the billing server 400 according to the present embodiment includes a communication controller (a second receiver) 40, a decryptor 41, a MAC verifier 42, a billing processor (an executor) 43 and the like. Each of these functions is implemented by installing software. Each functional unit is thus implemented when a program is executed by a CPU (not shown) included in the billing server 400. Note that the communication controller 40 may be implemented when the program is executed by an arithmetic unit included in a communication IF (not shown) of the billing server 400. The function of the billing server 400 according to the present embodiment further includes a storage unit 94. The storage unit 94 corresponds to a predetermined storage region of an auxiliary storage unit (not shown) included in the billing server 400, for example. The storage unit 94 stores data received from the MDMS 100.

The communication controller 40 controls data communication with another device such as the MDMS 100. Specifically, the communication controller 40 receives the encrypted data, the MAC value, and the correction amount for the second total power usage transmitted from the MDMS 100. The communication controller 40 also transmits the request command (the control command indicating an operational request) to the MDMS 100. Accordingly, the communication controller 40 receives from the MDMS 100 the encrypted data, the MAC value, and the correction amount for the second total power usage and accepts the response for the request. Note that the request command transmitted to the MDMS 100 includes a control command which makes a request to transmit various billing information such as a unit price of power used in billing, for example.

The decryptor 41 decrypts the encrypted data for the second total power usage. Specifically, the decryptor 41 uses the common key provided for encryption/decryption and stored in the storage unit 94 to decrypt the encrypted data received and restores the second total power usage. Note that the storage unit 94 stores the common key provided for encryption/decryption and shared with the SM 200.

Decryption Method

A specific decryption method employed by the decryptor 41 according to the present embodiment will be described. The decryptor 41 first calculates the temporary key $Kp1\_t$ ($=h1(Kp, t)$) by using the common key $Kp$ shared with the SM 200 and the time $t$ (:t1 to t1440) corresponding to the encrypted data $cp\_all$ for the second total power usage that is received from the MDMS 100. The decryptor 41 then calculates the key sequence $KpST1\_t$ ($=ST(Kp1\_t)$) by the stream encryption ($ST( )$) based on the temporary key $Kp1\_t$ calculated. As a result, the decryptor 41 calculates the second total power usage (the total power usage that is used by the billing server 400) $dtp\_all$ at the time $t$ (time series in the aggregation range) by Equations (25) and (26) below and restores the total power usage from the encrypted data.

$$Kp\_all = KpST1\_t1\_sm + \ldots + KpST1\_t1440\_sm \quad (25)$$

$$dtp\_all = cp\_all - Kp\_all \quad (26)$$

The encrypted data for the second total power usage that is received from the MDMS 100 is associated with each of the aggregation times t1 to t1440 of the power usage in the billing period (the second unit time) during which the billing process is performed on the SM 200. Accordingly, the decryptor 41 calculates the key sequence of each temporary key for each of the aggregation times t1 to t1440 by using the common key shared with the SM 200, and uses each temporary key calculated to restore the second total power usage from the encrypted data for the second total power usage.

The MAC verifier 42 checks the validity of the restored second total power usage (verifies whether or not the restored second total power usage is free of error). Specifically, the MAC verifier 42 verifies whether or not the second total power usage is free of error by using the MAC value for the second total power usage that is restored by the decryptor 41, the correction amount for the second total power usage that is received from the MDMS 100, and the MAC verification key shared with the SM 200. Note that the MAC verification key shared with the SM 200 is stored in the storage unit 94.

MAC Verification Method

A specific MAC verification method employed by the MAC verifier 42 according to the present embodiment will be described. The MAC verifier 42 first calculates the temporary key $Kp2\_t$ ($=h2(Kp, t)$) by using a MAC verification key $Kp\_mac$ shared with the SM 200 and the time $t$ (:t1 to t1440) corresponding to the encrypted data $cp\_all$ for the second total power usage that is received from the MDMS 100. The MAC verifier 42 then calculates the key sequence $KpST2\_t$ ($=ST(Kp2\_t)$) by the stream encryption ($ST( )$) based on the temporary key $Kp2\_t$ calculated. As a result, the MAC verifier 42 checks the validity of the restored second total power usage by Equations (27) and (28) below.

$$KpST2\_all = KpST2\_t1\_ms + \ldots + KpST2\_t1440\_ms \quad (27)$$

$$Macp\_t = ? (dtp\_all - \Delta dp\_all) \times Kp\_mac + KpST2\_all \quad (28)$$

Note that a symbol (=?) in the expression represents an operator for the comparison determination. Accordingly, the MAC verifier 42 verifies whether or not the second total power usage is free of error on the basis of the determination result of whether or not the calculation result on the right side of Equation (28) matches the MAC value $Macp\_t$ for the second total power usage.

The billing processor 43 performs the billing process for the power used in the aggregation range. Specifically, the billing processor 43 transmits the request command to the MDMS 100 through the communication controller 40 at every billing period (the second unit time) elapsed for performing the billing process on the SM 200. As a result, the billing processor 43 performs the billing process according to a predetermined billing price on the basis of the second total power usage restored by the decryptor 41 from the data received from the MDMS 100.

The aforementioned function of the billing server 400 according to the present embodiment restores the power usage by decrypting the encrypted data for the second total power usage that is received from the MDMS 100. The billing server 400 then uses the MAC value for the second total power usage being received to check the validity of the restored power usage, executes a predetermined process on the basis of the power usage being checked, and provides the billing function.

As described above, the function of the power usage calculation system 1000 according to the present embodiment is implemented when each of the aforementioned functional units is operated in a coordinated manner. Specifically, each of the functional units is operated in the coordinated manner when the program is executed in each of the SM 200, the MDMS 100, the EMS 300, and the billing server 400.

The aforementioned program is provided while being stored in a storage medium that can be read by each device (a computer) in the execution environment, as a computer program product, the program having an installable or executable file format. In the MDMS 100, for example, the program has a modular construction including each of the aforementioned functional units where each functional unit is generated in the RAM of the main storage unit 102 when the CPU 101 reads and executes the program from a storage medium of the auxiliary storage unit 103. Note that the program may be provided by another method. For example, the program may be stored in an external device connected to the Internet or the like and downloaded via the communication channel N. Alternatively, the program may be provided while being incorporated beforehand into the ROM of the main storage unit 102 or the HDD of the auxiliary storage unit 103.

A process (the coordinated operation of the installed functional units between each device) performed by the power usage calculation system 1000 according to the present embodiment will be described by using a specific operation example and a flowchart.

Operation of SM 200 and MDMS 100

Figure 7:
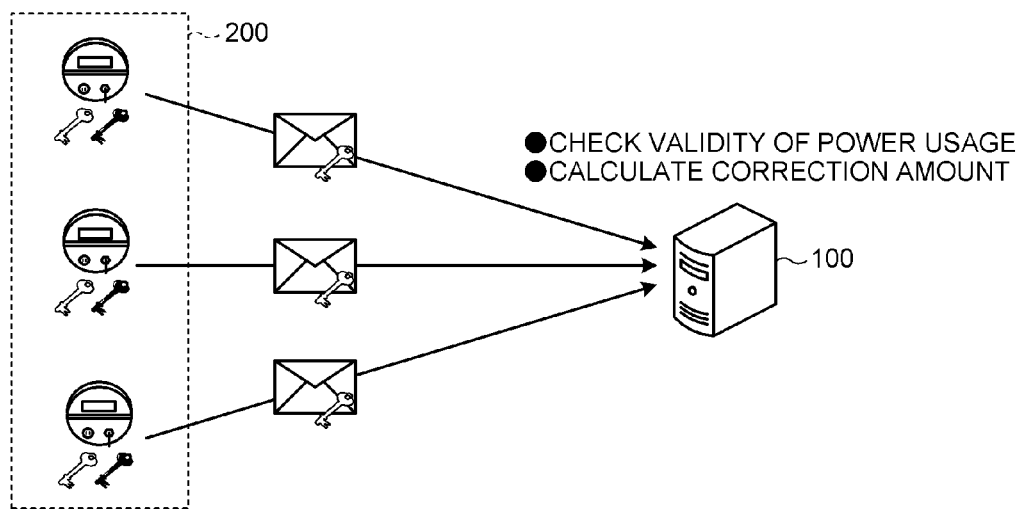
FIG. 7 is a diagram illustrating an operational example of the SM and the MDMS according to the first embodiment.

FIG. 7 is a diagram illustrating an operation example of the SM 200 and the MDMS 100 according to the present embodiment. As illustrated in FIG. 7, one or the plurality of SMs 200 installed in each household or office aggregates the power usage per unit time in the aggregation range. Subsequently, the SM 200 encrypts the power usage aggregated and generates the encrypted data for the power usage. The SM 200 also generates the MAC value corresponding to the encrypted data being generated. The encrypted data and the MAC value for the power usage generated in the aforementioned manner are transmitted to the MDMS 100. Thereafter, the MDMS 100 checks the validity of the power usage on the basis of the MAC value of the received data and corrects the power usage being used by each use system such as the EMS 300 or the billing system 4. The aforementioned operation is performed between the SM 200 and the MDMS 100 in the power usage calculation system 1000 according to the present embodiment. A specific procedural example of a process performed during the operation will be described below.

Figure 8:
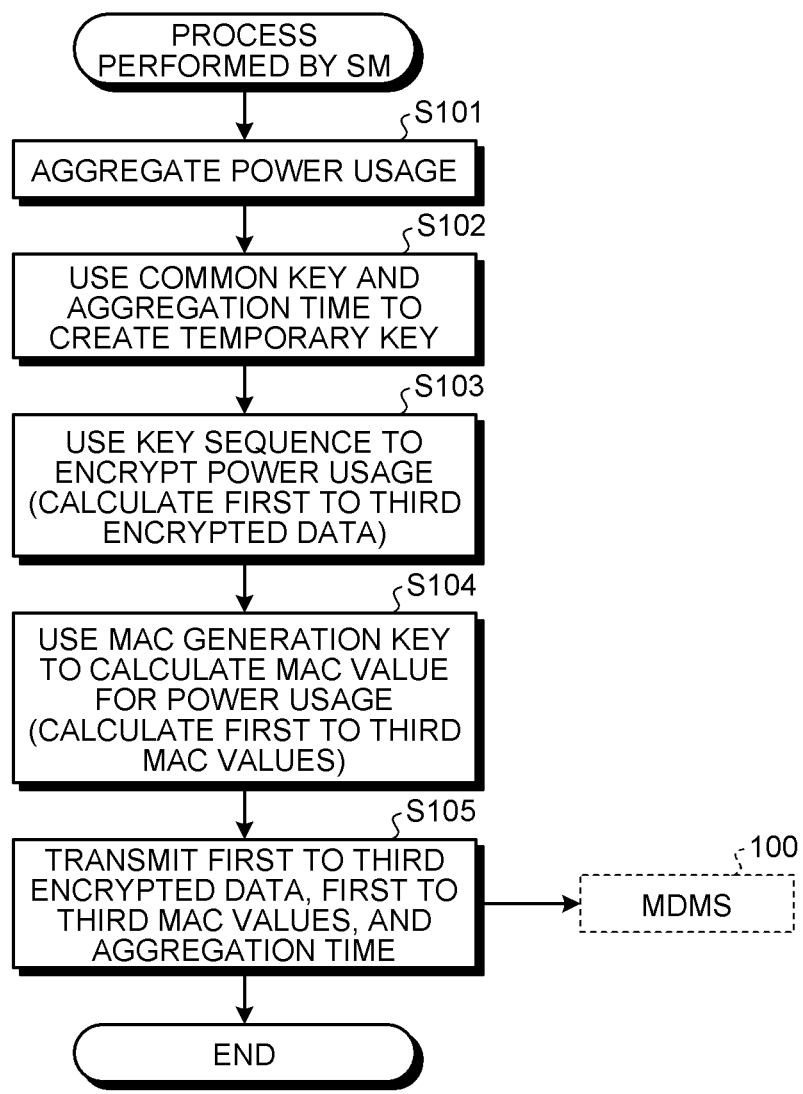
FIG. 8 is a diagram illustrating a procedural example of a process performed in the SM according to the first embodiment.

FIG. 8 is a diagram illustrating the procedural example of the process performed by the SM 200 according to the present embodiment. Each functional unit of the SM 200 performs the following process as illustrated in FIG. 8.

The power usage aggregator 21 aggregates the power usage measured per unit time in the aggregation range (step S101).

The encryptor/decryptor 22 then creates the temporary key by using the common key provided for encryption/decryption and shared between each of the use systems such as the MDMS 100, the EMS 300, and the billing system 4 and the aggregation time of the power usage (step S102). The encryptor/decryptor 22 at this time creates the temporary key corresponding to each use system. Next, the encryptor/decryptor 22 encrypts the aggregated power usage by using the key sequence obtained by the stream encryption which uses the temporary key corresponding to each use system as the key, and calculates the encrypted data for the power usage being used by each use system (step S103). Specifically, the encryptor/decryptor calculates the first encrypted data for the power usage being used by the MDMS 100, the second encrypted data for the power usage being used by the EMS 300, and the third encrypted data for the power usage being used by the billing system 4. Note that the encryptor/decryptor 22 performs encryption by employing the homomorphic encryption method.

The MAC generator 23 thereafter uses the MAC generation key shared with each use system and calculates the MAC value for the power usage being used by each use system (step S104). Specifically, the MAC generator calculates the first MAC value for the power usage being used by the MDMS 100, the second MAC value for the power usage being used by the EMS 300, and the third MAC value for the power usage being used by the billing system 4.

As a result, the communication controller 20 transmits to the MDMS 100 the calculation result including the first to third encrypted data and the first to third MAC values for the power usage as well as the aggregation time (step S105). Note that the storage unit 92 stores these calculation results.

Figure 9:
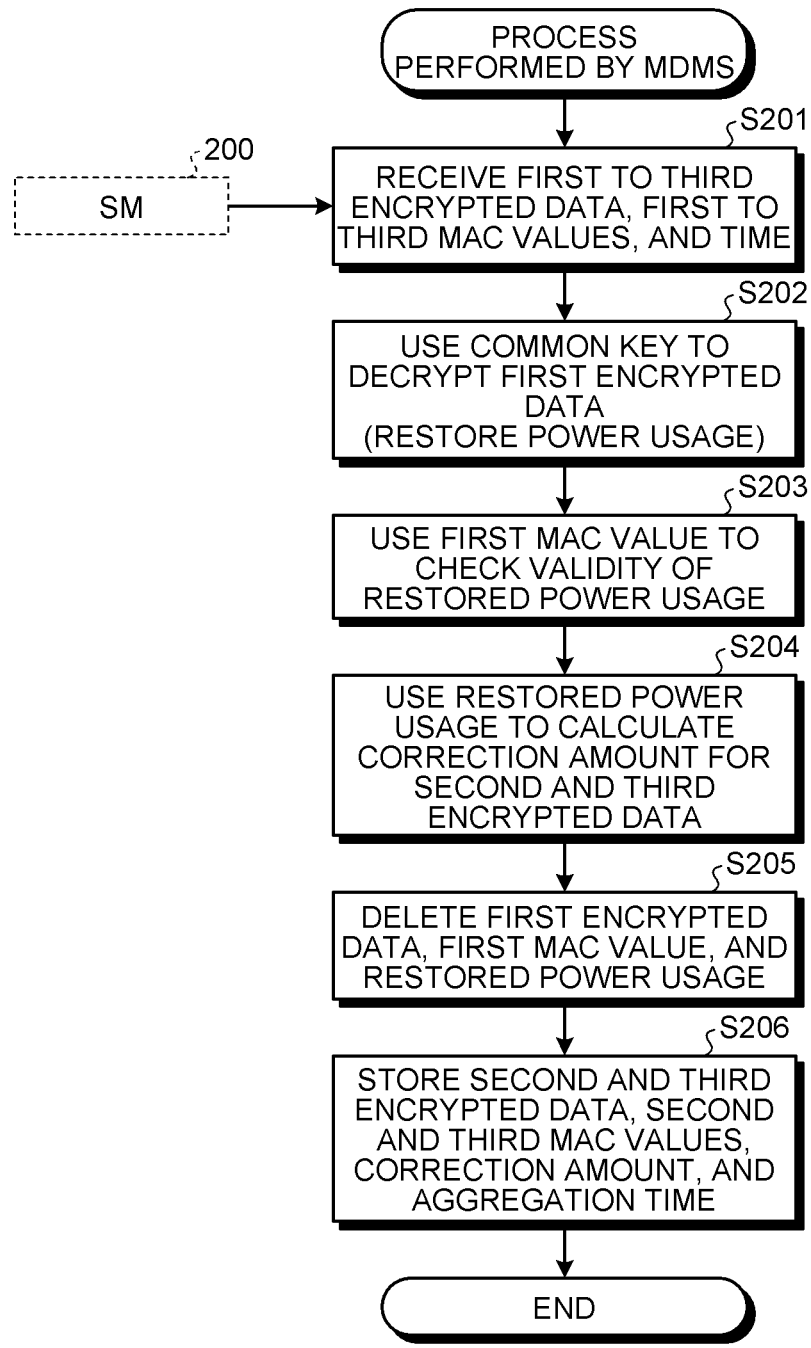
FIG. 9 is a diagram illustrating a procedural example of a process performed in the MDMS according to the first embodiment.

FIG. 9 is a diagram illustrating a procedural example of a process performed by the MDMS 100 according to the present embodiment. Each functional unit of the MDMS 100 performs the following process as illustrated in FIG. 9.

The communication controller 10 receives the first to third encrypted data, the first to third MAC values and the time of the power usage from the SM 200 (step S201).

The decryptor 11 then uses the common key provided for encryption/decryption and shared with the SM 200 to decrypt the first encrypted data being received (step S202). At this time, the decryptor 11 calculates the temporary key by using the common key shared with the SM 200 and the time corresponding to the first encrypted data being received. The decryptor 11 thereafter calculates the power usage at the time by using the key sequence obtained by the stream encryption which uses the calculated temporary key as the key, and restores the power usage from the first encrypted data.

Next, the corrector 12 uses the first MAC value received to check the validity of the restored power usage (step S203). The corrector 12 at this time verifies the validity by comparing the power usage restored this time with the power usage restored in the past, determining whether or not a differential value is smaller than or equal to a threshold, and determining whether or not the power usage restored this time is free of error. On the basis of the result of the validity check, the corrector 12 calculates the correction amount for the second and third encrypted data by using the restored power usage (step S204). As a result, the corrector 12 deletes the first encrypted data, the first MAC value, and the restored power usage from the storage unit 91 (step S205) and stores the corrected second and third encrypted data, the second and third MAC values, the correction amount, and the aggregation time into the storage unit 91 (step S206). Here, the corrector 12 stores, into the storage unit 91, the corrected second encrypted data and third encrypted data in combination with the correction amount.

As described above, in the power usage calculation system 1000 according to the present embodiment, the SM 200 calculates each of the encrypted data (first to third encrypted data) for the power usage that can be decrypted by each use system such as the MDMS 100, the EMS 300 and the billing system 4 that use the power usage. Moreover, in the power usage calculation system 1000 according to the present embodiment, the SM 200 calculates each of the MAC values (the first to third MAC values corresponding to the first to third encrypted data for the power usage) for the power usage being used by each use system. As a result, the calculation result is transmitted from the SM 200 to the MDMS 100 in the power usage calculation system 1000 according to the present embodiment. In response, the MDMS 100 of the power usage calculation system 1000 according to the present embodiment decrypts the encrypted data (the first encrypted data) provided for the MDMS 100 and received from the SM 200. In the power usage calculation system 1000 according to the present embodiment, each of the encrypted data (the second and third encrypted data) provided for each use system such as the EMS 300 and the billing system 4 is corrected on the basis of the decrypted power usage, whereby the correction amount is stored.

Operation of MDMS 100 and EMS 300

Figure 10:
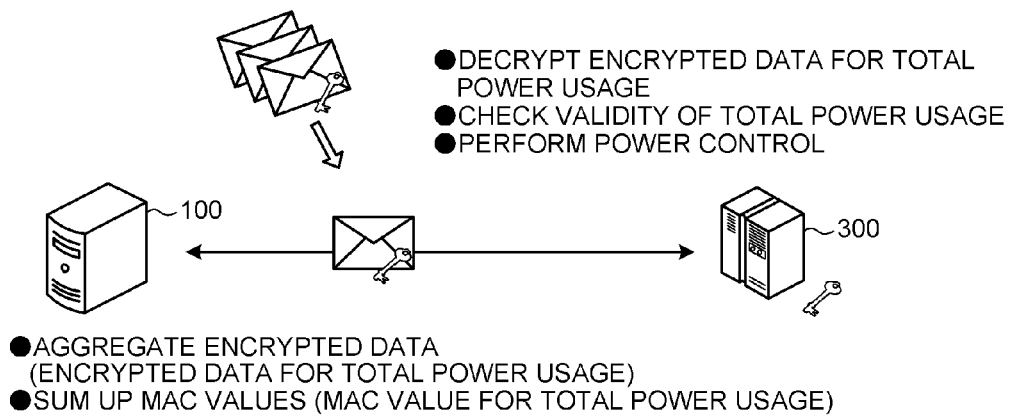
FIG. 10 is a diagram illustrating an operational example of the MDMS and the EMS according to the first embodiment.

FIG. 10 is a diagram illustrating an operational example of the MDMS 100 and the EMS 300 according to the present embodiment. As illustrated in FIG. 10, the MDMS 100 having accepted the request command from the EMS 300 generates the encrypted data for the total power usage by aggregating the encrypted data for the power usage being used by the EMS 300. The MDMS 100 also generates the MAC value for the total power usage by summing up the MAC value for the power usage being used by the EMS 300. The encrypted data and the MAC value for the total power usage that have been generated in the aforementioned manner are then transmitted and responded to the EMS 300 having made the request. In response, the EMS 300 restores the total power usage by decrypting the encrypted data for the total power usage being received, checks the validity of the restored total power usage on the basis of the MAC value for the total power usage being received, and performs power control on the basis of the total power usage. The aforementioned operation is performed between the MDMS 100 and the EMS 300 in the power usage calculation system 1000 according to the present embodiment. A specific procedural example of a process performed during the operation will be described below.

Figure 11:
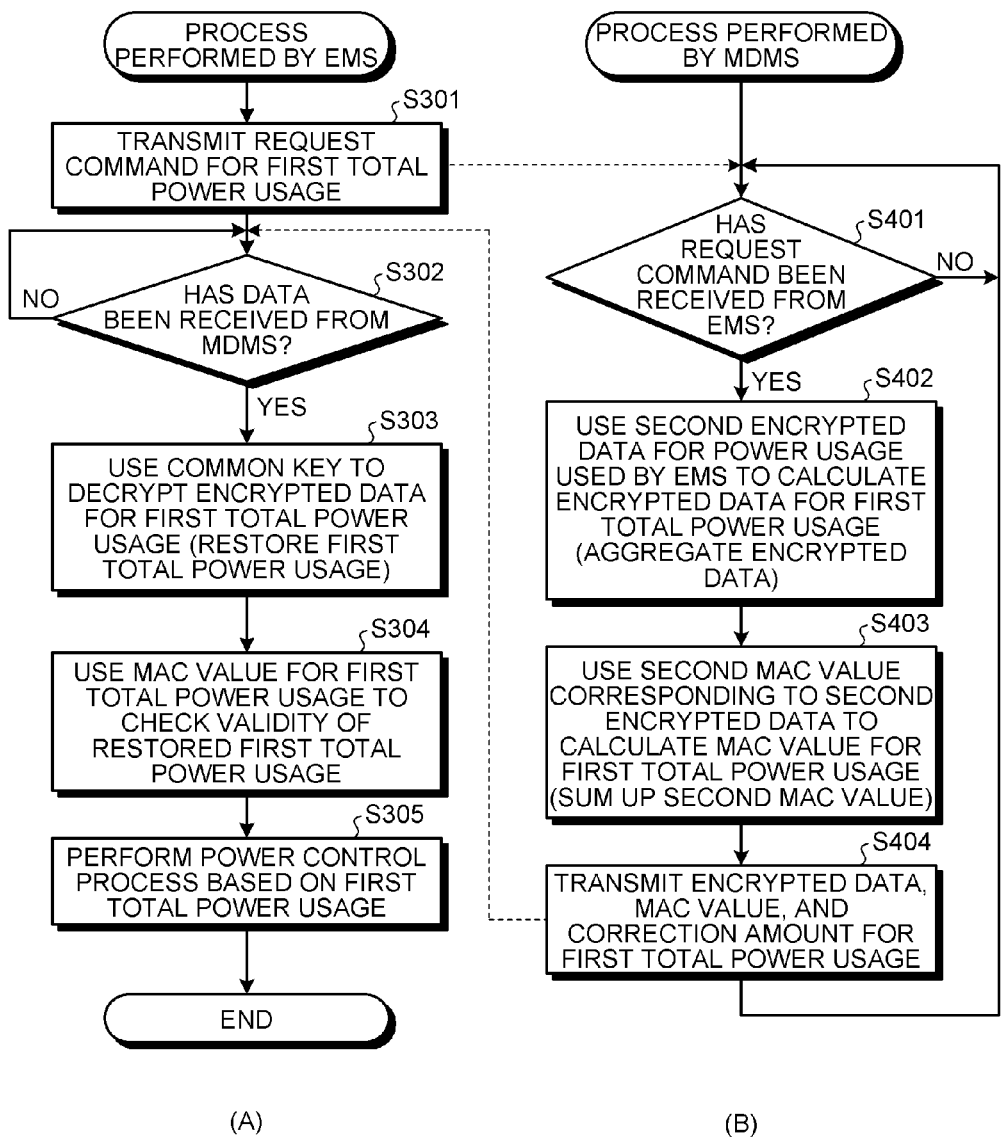
FIG. 11 is a diagram illustrating a procedural example of a process performed in the MDMS and the EMS according to the first embodiment.

FIG. 11 is a diagram illustrating the procedural example of the process performed by the MDMS 100 and the EMS 300 according to the present embodiment. In FIG. 11, (A) illustrates a process performed by the EMS 300, while (B) of FIG. 11 illustrates a process performed by the MDMS 100.

As illustrated in (A) and (B) of FIG. 11, each functional unit included in each of the EMS 300 and the MDMS 100 performs the following process.

Process Performed by EMS 300

The communication controller 30 transmits to the MDMS 100 the request command for the first total power usage being used in power control (step S301) and determines whether or not the data has been received from the MDMS 100 (step S302).

Determining that the data has been received from the MDMS 100 (step S302: YES), the communication controller 30 receives the encrypted data, the MAC value, and the correction amount for the first total power usage from the MDMS 100. Determining that the data has not been received from the MDMS 100 (step S302: NO), on the other hand, the communication controller 30 repeats the process performed in step S302 until the data has been received.

The decryptor 31 having received the data uses the common key provided for encryption/decryption and shared with the SM 200 to decrypt the encrypted data for the first total power usage being received (step S303). At this time, the decryptor 31 calculates the temporary key by using the common key shared with the SM 200 and the time corresponding to the encrypted data for the first total power usage being received. The decryptor 31 thereafter uses the key sequence obtained by the stream encryption which uses the calculated temporary key as the key to calculate the total power usage in the plurality of aggregation ranges at the same time, and restores the first total power usage from the encrypted data for the first total power usage.

Next, the MAC verifier 32 uses the MAC value for the first total power usage to check the validity of the restored first total power usage (step S304). The MAC verifier 32 at this time calculates the temporary key by using the MAC verification key shared with the SM 200 and the time corresponding to the encrypted data for the first total power usage being received. The MAC verifier 32 thereafter sums up the key sequence obtained by the stream encryption based on the calculated temporary key. Accordingly, the MAC verifier 32 checks the validity by determining whether or not the first total power usage is free of error according to a predetermined conditional expression in which the summation result and the MAC value for the first total power usage are used.

Subsequently, the power control determiner 33 performs the power control process on the basis of the first total power usage (step S305). The power control determiner 33 at this time determines whether or not to perform the power control on the basis of the restored first total power usage and performs the control in accordance with the determination result.

Process Performed by MDMS 100

The communication controller 10 determines whether or not the request command for the first total power usage to be used in the power control has been received from the EMS 300 (step S401).

Determining that the request command has been received from the EMS 300 (step S401: YES), the communication controller 10 shifts to the process of responding to the request from the EMS 300. Determining that the request command has not been received from the EMS 300 (step S401: NO), on the other hand, the communication controller 10 repeats the process performed in step S401 until the request command has been received.

The encrypted data aggregator 13 having received the request command then calculates the encrypted data for the first total power usage by using the second encrypted data for the power usage being used (requested) by the EMS 300 (step S402). At this time, the encrypted data aggregator 13 aggregates the second encrypted data for the power usage being used by the EMS 300 while targeting the plurality of aggregation ranges (the plurality of SMs 200) at the same aggregation time, and calculates the encrypted data for the first total power usage. Moreover, the encrypted data aggregator 13 calculates the correction amount (total value) for the first total power usage by using the correction amount used in correcting the second encrypted data.

Next, the MAC summarizer 14 uses the second MAC value corresponding to the second encrypted data to calculate the MAC value for the first total power usage (step S403). The MAC summarizer 14 at this time calculates the MAC value for the first total power usage by summing up the second MAC value corresponding to the second encrypted data used in calculating the first total power usage.

As a result, the communication controller 10 transmits to the EMS 300 the calculation result including the encrypted data, the MAC value, and the correction amount for the first total power usage (step S404). Note that these calculation results are stored in the storage unit 91.

As described above, in the power usage calculation system 1000 according to the present embodiment, the MDMS 100 having received the request from the EMS 300 calculates the encrypted data for the first total power usage per unit time in the aggregation range by using the encrypted data provided for the EMS 300. Then, the MDMS 100 of the power usage calculation system 1000 according to the present embodiment calculates the MAC value for the first total power usage by summing up the MAC value for the power usage. As a result, the calculation result is transmitted and responded from the MDMS 100 to the EMS 300 having made the request, in the power usage calculation system 1000 according to the present embodiment. The EMS 300 of the power usage calculation system 1000 according to the present embodiment therefore restores the power usage by decrypting the encrypted data for the first total power usage being received from the MDMS 100. Then, the EMS 300 of the power usage calculation system 1000 according to the present embodiment uses the MAC value for the first total power usage being received to check the validity of the restored power usage, performs the predetermined process on the basis of the power usage being checked, and provides the power control function.

Operation of MDMS 100 and Billing Server 400

Figure 12:
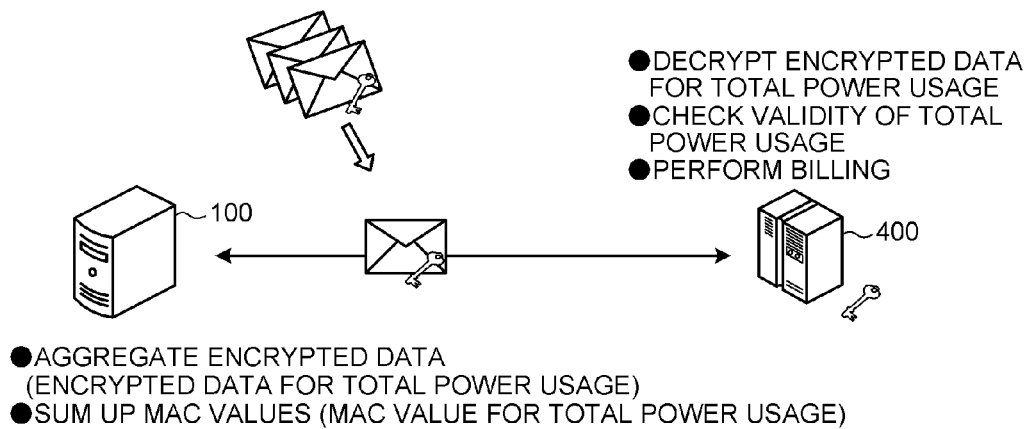
FIG. 12 is a diagram illustrating an operational example of the MDMS and a billing server according to the first embodiment.

FIG. 12 is a diagram illustrating an operational example of the MDMS 100 and the billing server 400 according to the present embodiment. As illustrated in FIG. 12, the MDMS 100 having accepted the request command from the billing server 400 generates the encrypted data for the total power usage by aggregating the encrypted data for the power usage being used by the billing server 400. The MDMS 100 also generates the MAC value for the total power usage by summing up the MAC value for the power usage being used by the billing server 400. The encrypted data and the total MAC value for the total power usage being generated in such manner are then transmitted and responded to the billing server 400 which has made the request. In response, the billing server 400 restores the total power usage by decrypting the encrypted data for the total power usage being received, checks the validity of the restored total power usage on the basis of the MAC value for the total power usage being received, and performs billing on the basis of the total power usage. The aforementioned operation is performed between the MDMS 100 and the billing server 400 in the power usage calculation system 1000 according to the present embodiment. A specific procedural example of a process performed during the operation will be described below.

Figure 13:
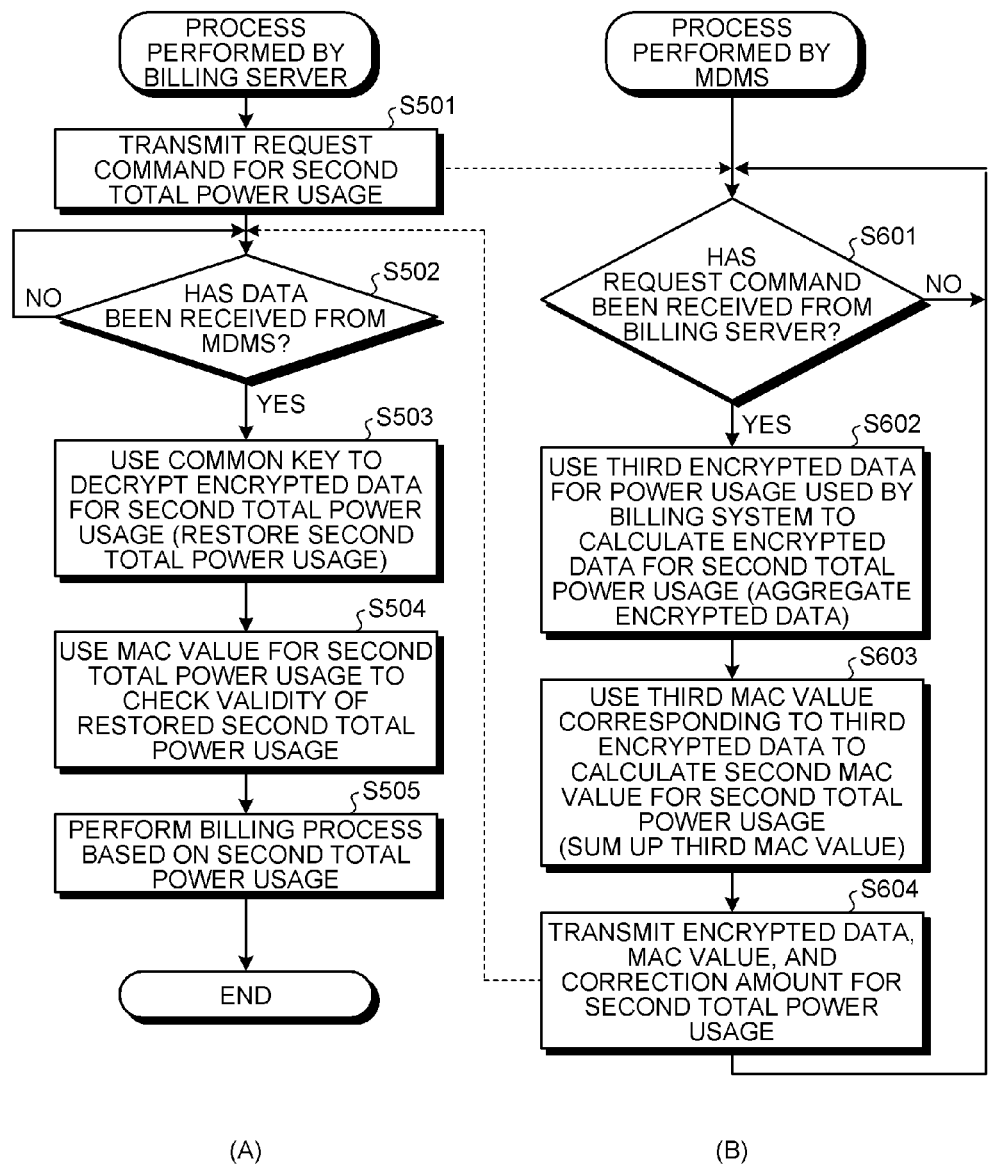
FIG. 13 is a diagram illustrating a procedural example of a process performed in the MDMS and the billing server according to the first embodiment.

FIG. 13 is a diagram illustrating the procedural example of the process performed between the MDMS 100 and the billing server 400 according to the present embodiment. In FIG. 13, (A) illustrates the process performed by the billing server 400, while (B) of FIG. 13 illustrates the process performed by the MDMS 100.

As illustrated in (A) and (B) of FIG. 13, each functional unit included in each of the billing server 400 and the MDMS 100 performs the following process.

Process Performed by Billing Server 400

The communication controller 40 transmits, to the MDMS 100, the request command for the second total power usage to be used in billing (step S501) and determines whether or not the data has been received from the MDMS 100 (step S502).

Determining as a result that the data has been received from the MDMS 100 (step S502: YES), the communication controller 40 receives the encrypted data, the MAC value, and the correction amount for the second total power usage from the MDMS 100. Determining that the data has not been received from the MDMS 100 (step S502: NO), on the other hand, the communication controller 40 repeats the process performed in step S502 until the data has been received.

The decryptor 41 having received the data uses the common key provided for encryption/decryption and shared with the SM 200 to decrypt the encrypted data for the second total power usage being received (step S503). At this time, the decryptor 41 calculates the temporary key by using the common key shared with the SM 200 and the time (time series) corresponding to the encrypted data for the second total power usage being received. The decryptor 41 then calculates the total power usage in time series within the aggregation range by using the key sequence obtained by the stream encryption which uses the calculated temporary key as the key, and restores the second total power usage from the encrypted data for the second total power usage.

Next, the MAC verifier 42 uses the MAC value for the second total power usage to check the validity of the restored second total power usage (step S504). The MAC verifier 42 at this time calculates the temporary key by using the MAC verification key shared with the SM 200 and the time corresponding to the encrypted data for the second total power usage being received. The MAC verifier 42 thereafter sums up the key sequence obtained by the stream encryption based on the calculated temporary key. Accordingly, the MAC verifier 42 checks the validity by determining whether or not the second total power usage is free of error in accordance with a predetermined conditional expression in which the summation result and the MAC value for the second total power usage are used.

Thereafter, the billing processor 43 performs the billing process on the basis of the second total power usage (step S505). The billing processor 43 at this time performs the billing according to the predetermined billing price on the basis of the restored second total power usage.

Process Performed by MDMS 100

The communication controller 10 determines whether or not the request command for the second total power usage to be used in billing has been received from the billing server 400 (step S601).

Determining as a result that the request command has been received from the billing server 400 (step S601: YES), the communication controller 10 shifts to the process of responding to the request from the billing server 400. Determining that the request command has not been received from the billing server 400 (step S601: NO), on the other hand, the communication controller 10 repeats the process performed in step S601 until the request command has been received.

Upon receiving the request command, the encrypted data aggregator 13 calculates the encrypted data for the second total power usage by using the third encrypted data for the power usage being used (requested) by the billing server 400 (step S602). The encrypted data aggregator 13 at this time aggregates the third encrypted data for the power usage being used by the billing system 4 while targeting the plurality of aggregation times (in time series) in the same aggregation range (the same SM 200), and calculates the encrypted data for the second total power usage. The encrypted data aggregator 13 also calculates the correction amount (the total value) for the second total power usage by using the correction amount that is used in correcting the third encrypted data.

Next, the MAC summarizer 14 uses the third MAC value corresponding to the third encrypted data to calculate the MAC value for the second total power usage (step S603). The MAC summarizer 14 at this time calculates the MAC value for the second total power usage by summing up the third MAC value corresponding to the third encrypted data used in calculating the second total power usage.

As a result, the communication controller 10 transmits to the billing server 400 the calculation result including the encrypted data, the MAC value, and the correction amount for the second total power usage (step S604). Note that these calculation results are stored in the storage unit 91.

As described above, in the power usage calculation system 1000 according to the present embodiment, the MDMS 100 having accepted the request from the billing server 400 uses the encrypted data provided for the billing server 400 to calculate the encrypted data for the second total power usage per unit time within the aggregation range. The MDMS 100 of the power usage calculation system 1000 according to the present embodiment then calculates the MAC value for the second total power usage by summing up the MAC value for the power usage. As a result, in the power usage calculation system 1000 according to the present embodiment, the MDMS 100 transmits the calculation result to the billing server 400 which has made the request, thereby responding to the request. The billing server 400 of the power usage calculation system 1000 according to the present embodiment therefore restores the power usage by decrypting the encrypted data for the second total power usage being received from the MDMS 100. Subsequently, in the power usage calculation system 1000 according to the present embodiment, the billing server 400 checks the validity of the restored power usage by using the MAC value for the second total power usage being received, performs the predetermined process on the basis of the power usage being checked, and provides the billing function.

Summary

As described above, in the power usage calculation system 1000 according to the present embodiment, the SM 200 calculates each of the encrypted data for the power usage that can be decrypted by each use system such as the MDMS 100, the EMS 300 and the billing system 4 that use the power usage. The SM 200 also calculates each of the MAC values for the power usage being used by each use system. As a result, the SM 200 transmits the calculation result to the MDMS 100. In response, the MDMS 100 decrypts the encrypted data provided for the MDMS 100 and received from the SM 200. The MDMS 100 then corrects each of the encrypted data provided for each use system such as the EMS 300 and the billing system 4 on the basis of the decrypted power usage and stores the correction amount. Subsequently, the MDMS 100 accepts the request from each use system such as the EMS 300 or the billing system 4. The MDMS 100 calculates each encrypted data for the total power usage per unit time within the aggregation range by using the encrypted data provided for the use system from which the request has been made. The MDMS 100 then calculates each MAC value for the total power usage by summing up the MAC value for the power usage. As a result, the MDMS 100 responds to the request by transmitting the calculation result to the use system which has made the request. Each use system such as the EMS 300 or the billing system 4 therefore restores the power usage by decrypting the encrypted data for the total power usage being received from the MDMS 100. Then, each use system checks the validity of the restored power usage by using the MAC value for the total power usage being received, performs the predetermined process on the basis of the power usage being checked, and provides the predetermined function.

Accordingly, in the power usage calculation system 1000 according to the present embodiment, the privacy of the measurement destination can be protected by encrypting and concealing the power usage stored within the device or transmitted/received between the devices. Moreover, in the power usage calculation system 1000 according to the present embodiment, the falsification of data can be detected by calculating the MAC value for each of the power usage and the total power usage and managing each of the calculated MAC values in association with the power usage and the total power usage.

While the aforementioned embodiment has described the example where the function of the power usage calculation system 1000 is implemented by installing the software, a part or all of each functional unit described above may be implemented by installing hardware (such as a "circuit"), for example.

While the aforementioned embodiment has described the example where the key is shared between the SM 200 and each use system such as the MDMS 100, the EMS 300, or the billing system 4, the key may be shared among the SM 200, the MDMS 100, and the EMS 300, for example. The key may also be shared among the SM 200, the MDMS 100, and the billing system 4.

While the aforementioned embodiment has described the example where the power usage calculation system 1000 is used, there can be another system to which the function according to the present embodiment can be applied such as a system calculating gas usage. The applicable system according to the present embodiment may be a system which connects a measurement device and a server through a network, calculates total usage by making the server aggregate a measurement value of the usage from the measurement device, and provides a service using the total usage being calculated.

Variation

The aforementioned embodiment has described the method of generating the MAC by employing Equations (8) to (11) and the method of verifying the MAC by employing Equations (24) and (28). The present variation will propose an example where falsification of data can be detected by employing a method of generating, summing up, and verifying the MAC, the method differing from what is provided in the aforementioned embodiment. Note that description of an item similar to that in the aforementioned embodiment will be omitted by assigning the same reference numeral to the item, whereby an item different from that in the aforementioned embodiment will be described.

Function of SM 200

MAC Generation Method

A function of an SM 200 according to the present variation employs the following expression to calculate a MAC value corresponding to each use system. Letting "dt" be the power usage aggregated at time t, a MAC generator 23 according to the present variation uses a MAC generation key Kp_mac shared with a billing server 400 to calculate a third MAC value Macp_t for the power usage dt being used by the billing system 4, according to Equation (29) below.

$$\mathrm{Mac}p\_t = Kp\_\mathrm{mac}\^{}dt \tag{29}$$

A part "a^b" in the expression represents exponentiation or Modular exponentiation with some appropriate modulus.

Likewise, the MAC generator 23 uses a MAC generation key Ke_mac shared with an EMS 300 to calculate a second MAC value Mace_t for the power usage dt being used by the EMS 300, according to Equation (30) below.

$$\mathrm{Mac}e\_t = Ke\_\mathrm{mac}\^{}dt \tag{30}$$

Likewise, the MAC generator 23 uses a MAC generation key Km_mac shared with an MDMS 100 to calculate a first MAC value Macm_t for the power usage dt being used by the MDMS 100, according to Equation (31) below.

$$\mathrm{Mac}m\_t = Km\_\mathrm{mac}\^{}dt \tag{31}$$

Function of EMS 300

MAC Verification Method

A function of the EMS 300 according to the present variation does not make a MAC verifier 32 calculate a temporary key or a key sequence based on the temporary key calculated. The MAC verifier 32 according to the present variation checks validity of a first total power usage by the following expression. That is, the MAC verifier 32 uses the MAC generation key Ke_mac shared with the SM 200 to check the validity of the first total power usage restored by a decryptor 31, according to Equation (32) below.

$$Mac_{e\_t} = ?(Ke\_mac\hat{}dte\_all) + (Ke\_mac\hat{}\Delta de\_all) \quad (32)$$

A part "÷" in the expression represents division or Modulo division with some appropriate modulus.

Accordingly, the MAC verifier 32 verifies whether or not the first total power usage is free of error on the basis of a determination result of whether or not the calculation result of Equation (32) matches the MAC value Mace_t for the first total power usage.

Function of Billing Server 400

MAC Verification Method

A function of the billing server 400 according to the present variation does not make a MAC verifier 42 calculate a temporary key or a key sequence based on the temporary key calculated. The MAC verifier 42 according to the present variation checks the validity of a second total power usage by the following expression. That is, the MAC verifier 42 uses the MAC generation key Kp_mac shared with the SM 200 to check the validity of the second total power usage restored by a decryptor 41, according to Equation (33) below.

$$Mac_{p\_t} = ?(Kp\_mac\hat{}dtp\_all) + (Kp\_mac\hat{}\Delta dp\_all) \quad (33)$$

Accordingly, the MAC verifier 32 verifies whether or not the second total power usage is free of error on the basis of a determination result of whether or not the calculation result of Equation (33) matches the MAC value Mace_t for the second total power usage.

The present variation can therefore achieve similar effects to that in the aforementioned embodiment by employing the method of generating and verifying the MAC as described above. Furthermore, the method in the present variation can cut down the amount of calculation in verifying the MAC compared to the method illustrated in the aforementioned embodiment, so that the calculation cost such as a processing time can be reduced and that the process performed by the EMS 300 and the billing system 4 can be made efficient.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data management device, comprising:
    a receiver configured to receive at least one piece of encrypted data obtained by encrypting a piece of data and at least one message authentication code for the piece of encrypted data;
    a first calculator configured to aggregate pieces of encrypted data received to calculate aggregated encrypted data corresponding to a sum of the pieces of data encrypted;
    a second calculator configured to sum up message authentication codes received to calculate a total value of the message authentication codes for the aggregated encrypted data; and
    a transmitter configured to transmit the aggregated encrypted data and the total value of the message authentication codes, wherein
    the receiver is configured to receive a piece of encrypted data for a measured power usage and a message authentication code for the piece of encrypted data,
    the first calculator is configured to aggregate pieces of encrypted data received to calculate encrypted data for a total power usage,
    the second calculator is configured to sum up message authentication codes received to calculate a total value of the message authentication codes for the total power usage, and
    the transmitter is configured to transmit the encrypted data for the total power usage and the total value of the message authentication codes for the total power usage to a system using the power usage.

2. The device according to claim 1, wherein the piece of encrypted data and the message authentication code are homomorphic.

3. The device according to claim 1, wherein each piece of encrypted data to be aggregated by the first calculator is encrypted with an encryption key shared between a source from which the each piece of encrypted data is transmitted and a destination to which the aggregated encrypted data is transmitted.

4. The device according to claim 3, wherein
    the pieces of encrypted data to be aggregated by the first calculator are obtained by encrypting pieces of data used by a system corresponding to the destination,
    the first calculator is configured to calculate the aggregated encrypted data for the system, and
    the transmitter is configured to transmit the aggregated encrypted data that is calculated to the system.

5. The device according to claim 1, wherein each of the message authentication codes to be summed up by the second calculator is generated by using a generation key shared between a source from which the each of the message authentication codes is transmitted and a destination to which the total value of the message authentication codes is transmitted.

6. The device according to claim 5, wherein
    the message authentication codes to be summed up by the second calculator are for the pieces of encrypted data obtained by encrypting pieces of data used by a system corresponding to the destination,
    the second calculator is configured to calculate the total value of the message authentication code for the system, and
    the transmitter is configured to transmit the total value of the message authentication codes to the system.

7. A data management method, comprising:
    receiving at least one piece of encrypted data obtained by encrypting a piece of data and at least one message authentication code for the piece of encrypted data;
    aggregating pieces of encrypted data received to calculate aggregated encrypted data corresponding to a sum of the pieces of data encrypted;

summing up message authentication codes received to calculate a total value of the message authentication codes for the aggregated encrypted data; and transmitting the aggregated encrypted data and the total value of the message authentication codes, wherein the receiving receives a piece of encrypted data for a measured power usage and a message authentication code for the piece of encrypted data, the aggregating aggregates pieces of encrypted data received to calculate encrypted data for a total power usage, the summing up sums up message authentication codes received to calculate a total value of the message authentication codes for the total power usage, and the transmitting transmits the encrypted data for the total power usage and the total value of the message authentication codes for the total power usage to a system using the power usage.

8. The method according to claim 7, wherein the piece of encrypted data and the message authentication code are homomorphic.

9. The method according to claim 7, wherein each piece of encrypted data to be aggregated at the aggregating is encrypted with an encryption key shared between a source from which the each piece of encrypted data is transmitted and a destination to which the aggregated encrypted data is transmitted.

10. The method according to claim 9, wherein the pieces of encrypted data to be aggregated at the aggregating are obtained by encrypting pieces of data used by a system corresponding to the destination, at the aggregating, aggregated encrypted data is calculated for the system, and at the transmitting, the aggregated encrypted data that is calculated is transmitted to the system.

11. The method according to claim 7, wherein each of the message authentication codes to be summed up at the summing up is generated by using a generation key shared between a source from which the each of the message authentication codes is transmitted and a destination to which the total value of the message authentication codes is transmitted.

12. The method according to claim 11, wherein the message authentication codes to be summed up at the summing up are for the pieces of encrypted data obtained by encrypting pieces of data used by a system corresponding to the destination, at the summing up, the total value of the message authentication code is calculated for the system, and at the transmitting, the total value of the message authentication codes is transmitted to the system.

13. A computer program product comprising a non-transitory computer-readable medium containing a program executed by a computer, the program causing the computer to execute:

receiving at least one piece of encrypted data obtained by encrypting a piece of data and at least one message authentication code for the piece of encrypted data;

aggregating pieces of encrypted data received to calculate aggregated encrypted data corresponding to a sum of the pieces of data encrypted;

summing up message authentication codes received to calculate a total value of the message authentication codes for the aggregated encrypted data; and transmitting the aggregated encrypted data and the total value of the message authentication codes, wherein the receiving receives a piece of encrypted data for a measured power usage and a message authentication code for the piece of encrypted data, the aggregating aggregates pieces of encrypted data received to calculate encrypted data for a total power usage, the summing up sums up message authentication codes received to calculate a total value of the message authentication codes for the total power usage, and the transmitting transmits the encrypted data for the total power usage and the total value of the message authentication codes for the total power usage to a system using the power usage.

14. The product according to claim 13, wherein the piece of encrypted data and the message authentication code are homomorphic.

15. The product according to claim 13, wherein each piece of encrypted data to be aggregated at the aggregating is encrypted with an encryption key shared between a source from which the each piece of encrypted data is transmitted and a destination to which the aggregated encrypted data is transmitted.

16. The product according to claim 15, wherein the pieces of encrypted data to be aggregated at the aggregating are obtained by encrypting pieces of data used by a system corresponding to the destination, at the aggregating, aggregated encrypted data is calculated for the system, and at the transmitting, the aggregated encrypted data that is calculated is transmitted to the system.

17. The product according to claim 13, wherein each of the message authentication codes to be summed up at the summing up is generated by using a generation key shared between a source from which the each of the message authentication codes is transmitted and a destination to which the total value of the message authentication codes is transmitted.

* * * * *